(12) United States Patent
Abe et al.

(10) Patent No.: US 8,509,980 B2
(45) Date of Patent: Aug. 13, 2013

(54) HYBRID VEHICLE

(75) Inventors: Hiroshi Abe, Isehara (JP); Takeshi Ohno, Yamato (JP); Toshio Honda, Ebina (JP); Takeshi Hirata, Kawasaki (JP); Munetoshi Ueno, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/394,838

(22) PCT Filed: Oct. 27, 2010

(86) PCT No.: PCT/JP2010/069076
§ 371 (c)(1),
(2), (4) Date: Mar. 8, 2012

(87) PCT Pub. No.: WO2011/114566
PCT Pub. Date: Sep. 22, 2011

(65) Prior Publication Data
US 2012/0185119 A1 Jul. 19, 2012

(30) Foreign Application Priority Data
Mar. 16, 2010 (JP) .................................. 2010-058607

(51) Int. Cl.
*B60W 20/00* (2006.01)
(52) U.S. Cl.
USPC ....................... 701/22; 180/65.285; 180/65.31
(58) Field of Classification Search
USPC ...................... 701/22, 80; 180/65.285, 65.31, 180/65.245, 65.225, 65.265, 65.26–65.28, 180/65.1; 903/903, 930, 902, 906, 907; 318/34, 35, 49, 51, 87
See application file for complete search history.

(56) References Cited

U.S. PATENT DOCUMENTS

| | | | |
|---|---|---|---|
| 6,522,024 B1 * | 2/2003 | Takaoka et al. | 290/40 C |
| 7,062,916 B2 | 6/2006 | Kamijo et al. | |
| 7,918,762 B2 | 4/2011 | Muta et al. | |
| 2009/0012665 A1 * | 1/2009 | Brennan et al. | 701/22 |
| 2009/0105043 A1 | 4/2009 | Muta et al. | |

FOREIGN PATENT DOCUMENTS

| | | |
|---|---|---|
| JP | 2000-104590 A | 4/2000 |
| JP | 2005-351259 A | 12/2005 |
| JP | 2006-288170 A | 10/2006 |
| JP | 2007-216841 A | 8/2007 |
| JP | 2008-273460 A | 11/2008 |
| JP | 2009-173235 A | 8/2009 |

* cited by examiner

*Primary Examiner* — Marthe Marc-Coleman
(74) *Attorney, Agent, or Firm* — Foley & Lardner LLP

(57) ABSTRACT

A hybrid vehicle includes an engine, a motor, the engine and the motor being driving sources, a first traveling mode in which the vehicle is driven utilizing an output of the engine, and a second traveling mode in which the vehicle is driven through an output of the motor with the engine stopped. The hybrid vehicle further includes an air density detecting section configured to detect an air density of an environment under which the vehicle travels and, in a case where the detected air density is reduced with respect to a standard air density, the motor output in the second traveling mode is reduced with respect to the motor output in a standard air density such that a driving force of the vehicle in the second traveling mode when the traveling mode is switched approaches the driving force of the vehicle in the first traveling mode.

10 Claims, 16 Drawing Sheets

16: engine speed sensor
17: crank angle sensor
18: A/F sensor
19: accelerator opening angle sensor
20: throttle sensor
21: vehicle speed sensor
22: coolant temperature sensor
23: atmospheric pressure sensor
24: intake air temperature sensor
25: airflow meter

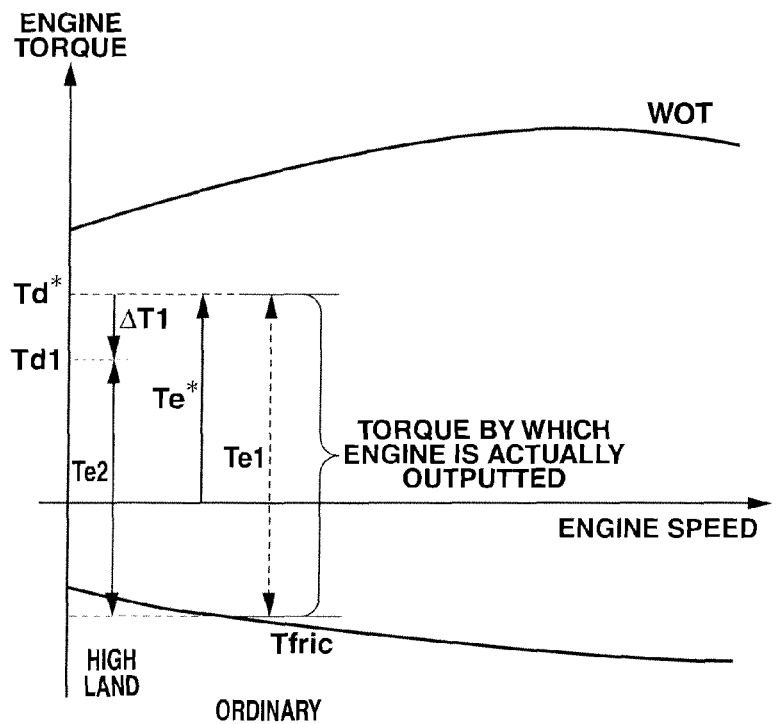
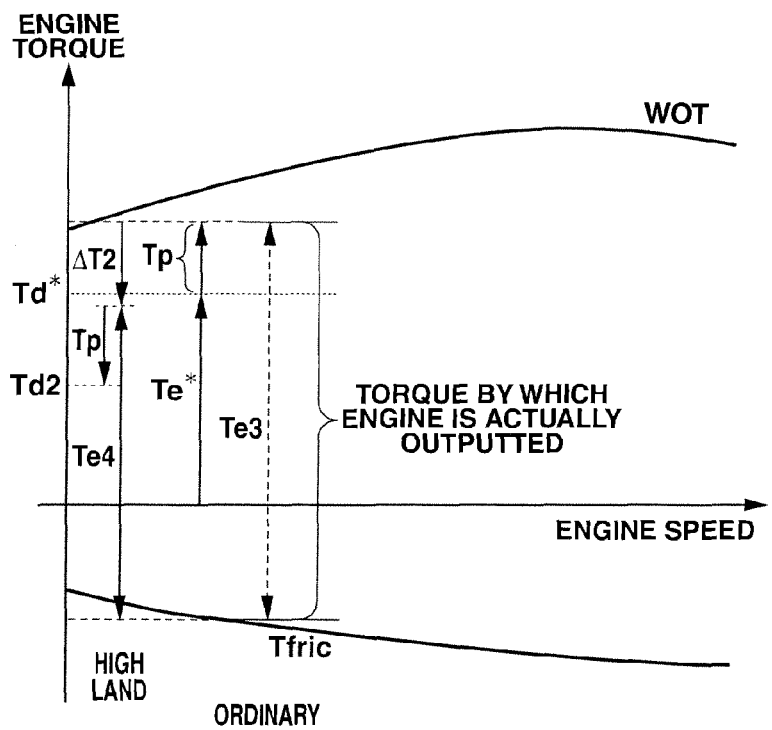

HYBRID VEHICLE

TECHNICAL FIELD

The present invention relates to a hybrid vehicle equipped with an engine and a motor as driving sources.

BACKGROUND ART

A patent document 1 JP2005-351250, discloses a technique such that, in a hybrid vehicle including an engine and a first motor, both thereof being linked to driving wheels, and a second motor which is capable of generating an electric power using at least a part of a power from the engine, the first motor and second motor are drivingly controlled to modify an engine speed so as to cancel an influence when an air density is varied, thus an engine output being made substantially equal to a target value.
In addition, a patent document 2 JP2000-104590, discloses another technique such that, in the hybrid vehicle including a plurality of driving sources constituted by the engine and the motors, the motors controlling the driving force of the vehicle, and a transmission constituted by planetary gear sets, in a case where an output of the engine is reduced due to a variation in the atmospheric pressure and so forth and a vehicle torque that a vehicle driver intends is not achieved, the motors assist an insufficient part of the vehicle torque to obtain the vehicle torque that the driver intends.

However, since, in the hybrid vehicle disclosed in patent document 1, output torques of these first and second motors are not affected by the air density when the engine speed is modified by means of first and second motors so as to cancel the influence when the air density is varied, a stepwise difference in the driving force of the vehicle is developed when a driving state is transferred from a state in which the driving force of the vehicle is generated by the engine to a state in which the driving force of the vehicle is generated by the motor with the engine stopped and, consequently, there is a possibility that un unpleasant feeling is given to a vehicle driver.

In addition, in the hybrid vehicle described in patent document 2, such a problem that a consumed electrical power of a vehicle battery is increased when all of insufficient part of the output torque of the engine are tried to be compensated for by assistance torques of the motors is raised. In addition, in a case where the insufficient part of the output torque of the engine is assisted by the motors under a situation that each of the motors is generating the electric power, an electric power generation load of the motors is reduced so that there is a possibility that a sufficient electric power generation quantity cannot be secured any more.

Therefore, according to the present invention, in the hybrid vehicle having a first traveling mode in which the vehicle is driven utilizing the output of the engine and a second traveling mode in which the vehicle is driven through an output of the motor with the engine stopped, in a case where the air density is reduced with respect to a standard air density, the output of the motor in the second traveling mode is reduced with respect to the output of the motor in the standard air density.

BRIEF DESCRIPTION OF THE DRAWINGS

FIG. 11 is an explanatory view representing diagrammatically a difference in the actual torque according to the difference in the air density in the vehicle equipped with only the engine as the driving source.
FIG. 12 is an explanatory view representing diagrammatically the difference in the actual engine torque due to the difference in the air density in the hybrid vehicle equipped with the engine and the motor as the driving sources.

DESCRIPTION OF THE EMBODIMENTS

Figure 1:
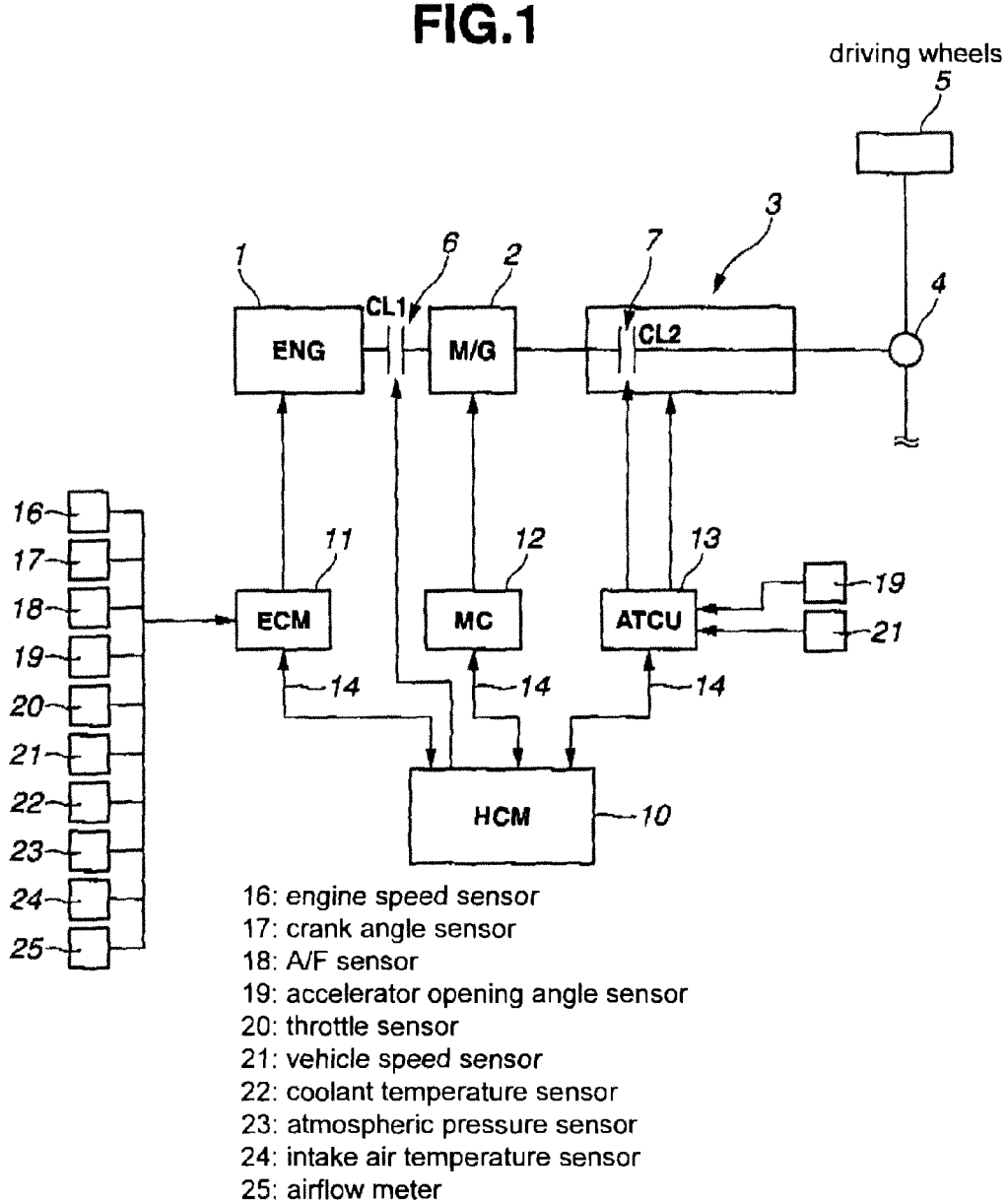
FIG. 1 is an explanatory view representing diagrammatically a system configuration of a hybrid vehicle to which the present invention is applicable.

In a case where, in a hybrid vehicle according to the present invention described hereinbelow, a stepwise difference in a driving force of the vehicle when a traveling mode is switched between a first traveling mode in which an output of an engine is utilized to drive the vehicle (an HEV traveling mode as will, herein, be described later) and a second traveling mode in which the vehicle is driven through the output of a motor with the engine stopped (an EV traveling mode as will be described later) can be eliminated or relieved.

This is because, in a case where the air density is reduced and is lower than a standard air density, a motor output in the second traveling mode is reduced with respect to the motor output when the air density is not reduced and is not lower than the standard air density such that a driving force of the vehicle in the second traveling mode approaches the driving force of the vehicle in the first traveling mode when the traveling mode is switched.

Then, in a case where, in the hybrid vehicle according to the present invention, the air density is reduced and is lower than the standard air density, the motor output in the second traveling mode is reduced than the motor output when the air density is not reduced and is not lower than the standard air density. It is, therefore, possible to eliminate or relieve the stepwise difference in the vehicular driving force when the traveling mode is switched between the first traveling mode and the second traveling mode, for example, in a case where the first traveling mode is in a traveling power generation state, without a compensation such that all shortages in the engine output caused by the reduction of the air density than the standard air density are compensated for by such a torque control of the motor as to reduce a power generation torque of the motor (as to reduce an electric power generation quantity).

In addition, in a case where, for example, the first traveling mode is in a motor assistance traveling state, it is possible to eliminate or relieve the stepwise difference of the driving force of the vehicle when the traveling mode is switched between the first traveling mode and the second traveling mode without the compensation such that all shortages in the engine output caused by the reduction of the air density than the standard air density are compensated for by such a torque control of the motor as to be assisted by the torque of the motor (as to increase an electric power consumption).

In other words, in a case where, in the hybrid vehicle according to the present invention, the air density is reduced and is lower than the standard air quantity, the motor output in the second traveling mode is reduced with respect to the motor output when the air density is not reduced and is not lower than the standard air density. Thus, the stepwise difference in the vehicular driving force is eliminated or relieved when the traveling mode is switched between the first traveling mode and the second traveling mode. At this time, as compared with the case where all of output shortages (a quantity by which the engine output is reduced) of the engine caused by the reduction in the air quantity than the standard air quantity are compensated for by the torque control of the motor, an insufficient power generation at the motor in a case where the first traveling mode is in the traveling power generation state can be suppressed and an increase in the power consumption can be suppressed in a case where the first traveling mode is in the motor assistance traveling state.

Preferred embodiments according to the present invention will, hereinafter, be described in details with reference to the drawings.

FIG. 1 diagrammatically shows an explanatory view of a system configuration of a hybrid vehicle to which the present invention is applicable.

Hybrid vehicle includes: for example, an in-line four cylinder engine (an internal combustion engine) 1: a motor/generator 2 (described hereinafter as a motor 2) which also functions as a generator, both of engine 1 and motor 2 being driving sources of the vehicle; an automatic transmission 3 which transmits powers of engine 1 and motor 2 to driving wheels 5 via a differential gear 4; a first clutch 6 (CL1) interposed between engine 1 and motor 2; and a second clutch 7 (CL2) interposed between motor 2 and driving wheels 5.

An automatic transmission 3, for example, automatically switches (performs a gear shift control) a gear ratio of a plurality of stages such as forward five speeds and one reverse speed or forward six speeds and one reverse speed in accordance with a vehicle speed, an accelerator opening angle, and so forth. This automatic transmission 3 is provided with a gear stage at an inside of which a one-way clutch is intervened from among a plurality of gear shift stages. In addition, a second clutch 7 in this embodiment is not necessarily a clutch that is further added as a special clutch but instead some frictional element for a selection of the forward gear shift stages or instead some clutch element for the selection of the reverse shift stage from among a plurality of frictional elements is used for second clutch 7 of automatic transmission 3. It should be noted that automatic transmission 3 is not limited to the above-described stepwise type transmission but may be constituted by a continuously variable transmission.

This hybrid vehicle includes: an HCM (hybrid control module) 10 which performs an integrated control for the vehicle; an ECM (Engine Control Module) 11; an MC (Motor Controller) 12; and ATCU (Automatic Transmission Control Unit) 13.

HCM 10 is connected to ECM 11, MC 12, and ATCU 13 via a communication line 14 which can mutually perform an information exchange.

ECM 11 inputs output signals from an engine speed sensor 16 which detects a revolution speed of engine 1; a crank angle sensor 17 which detects a crank angle of a crankshaft; an A/F sensor 18 which detects an exhaust air-fuel ratio; an accelerator opening angle sensor 19 which detects an accelerator opening angle from a depression quantity of an accelerator pedal; a throttle sensor 20 which detects an opening angle of a throttle valve; a vehicle speed sensor 21 which detects a vehicle speed; a water coolant temperature sensor 22 which detects a coolant temperature of engine 1; an atmospheric pressure sensor 23 which detects an atmospheric pressure; an intake air temperature sensor 24 which detects an intake air temperature; and an airflow meter 25 which detects an intake air quantity.

ECM 11 controls engine 1 in accordance with a target engine torque command (a target demand torque) from HCM 10. Specifically, ECM 11 calculates the throttle opening angle to obtain a target engine torque determined by HCM 10 with a driving torque that a vehicle driver demands based on the accelerator opening angle, a battery charge quantity as will be described later, or a driving condition of the vehicle (for example, an acceleration or deceleration state) taken into consideration. The engine throttle valve is controlled to the calculated throttle valve opening angle and the intake air quantity obtained at this time is detected by airflow meter 25 and fuel is supplied to engine 1 to obtain a predetermined air-fuel ratio on a basis of the detected intake air quantity. It should be noted that the information from each of the above-described sensors is outputted to HCM 10 via communication line 14.

MC 12 controls motor 2 in accordance with a target motor torque command and so forth from HCM 10. In addition, a power running drive during which an electric power supplied from a battery (not shown) is applied to motor 2, a power regenerative drive during which motor 2 functions as a power generator and during which the above-described battery is charged, and a switching between an activation and a stop of motor 2 is controlled by means of MC 12. It should be noted that the output (a current value) of motor 2 is monitored by means of MC 12. In other words, MC 12 detects the output of motor 2.

ATCU 13 inputs the signals from above-described accelerator opening angle sensor 19, vehicle speed sensor 21, and so forth. ATCU 13 determines an optimum gear shaft stage from the vehicle speed, the accelerator opening angle, and so forth and performs the gear shift control according to a replacement of frictional elements in an inside of automatic transmission 3. In addition, since second clutch 7 is constituted by one frictional element of automatic transmission 3, second clutch 7 is also controlled via ATCU 13.

It should be noted that engagement and release of first clutch 6 are controlled on a basis of first clutch control command from HCM 10. In addition, each kind of command signals outputted from HCM 10 such as a target engine torque command, a target motor torque command, a gear shift control command (a second clutch control command), and a first clutch control command is calculated in accordance with a driving state. In addition, HCM 10 inputs the information on the charge-and-discharge state of the battery, the information on the state of charge (SOC) of the battery, and an input revolution speed of automatic transmission 3 (a revolution speed at a position between motor 2 and automatic transmission 3).

This hybrid vehicle includes two traveling modes in accordance with the engagement state and release state of first clutch 6. A first traveling mode is an engine use traveling mode (HEV traveling mode) traveling with first clutch 6 in the engagement state and engine 1 included in one of dynamic power sources. A second traveling mode is an electric vehicle traveling mode (EV traveling mode) with first clutch 6 in the open state and traveling with only the dynamic power of motor 2 as a dynamic power source, as a motor use traveling mode.

It should, herein, be noted that above-described HEV traveling mode includes three traveling states of "an engine traveling state ", " a motor assistance traveling state", and "a traveling power generation state". The engine traveling state means that driving wheels 5 are driven to move with only engine 1 as the power source. The motor assistance traveling state means that driving wheels 5 are driven to move with two of engine 1 and motor 2 as the power sources. The traveling power generation state simultaneously drives driving wheels 5 with engine 1 as the dynamic power source and, simultaneously, functions motor 2 as a power generator.

In the above-described traveling power generation state, during a constant vehicle speed driving and an acceleration driving, motor 2 is operated as an electric power generator utilizing the power of engine 1 and the generated electric power is used for a charge of the battery. In addition, during a deceleration driving, a braking energy is utilized with motor 2 as a power generator to regenerate a braking energy.

It should be noted that ECM 11 calculates the target throttle opening angle from the target engine torque calculated in accordance with the driving state but the generation torque is increased or decreased when an intake air density is varied in accordance with the variations in the atmospheric pressure and the intake air temperature.

Figure 2:
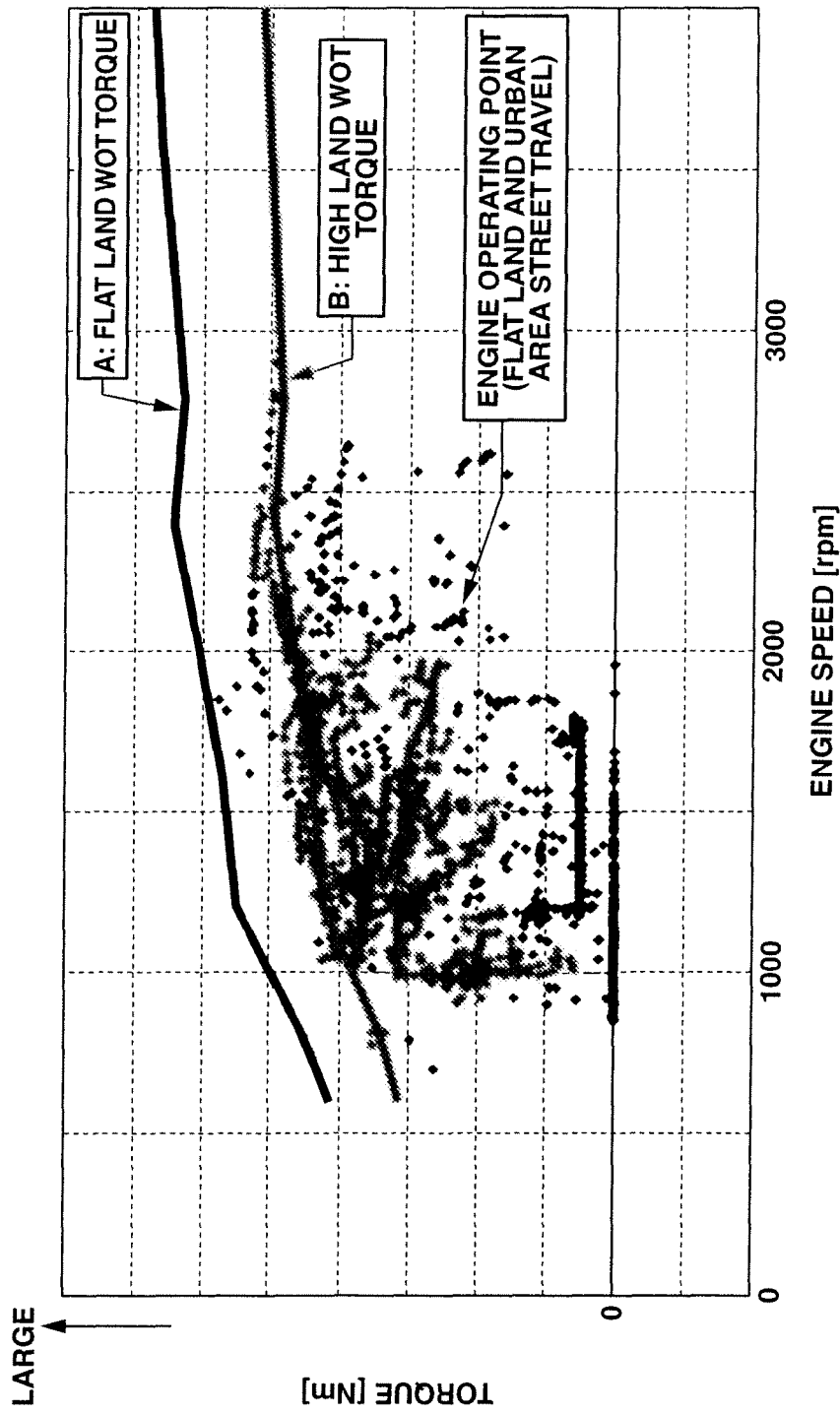
FIG. 2 is an explanatory view representing diagrammatically a correlation between a maximum torque and an engine operating region when the vehicle is traveling at an urban city street.

FIG. 2 is an explanatory view diagrammatically a correlation between a maximum torque and an engine operating region at a time of traveling in an urban area traveling.

A characteristic line A in FIG. 2 denotes a maximum torque (a flat land wide open throttle toraue (WOT)) that engine 1 can generate at a flat land, a characteristic line B in FIG. 2 denotes a maximum torque (a high land WOT torque) that engine 1 can generate at a high land (for example, an elevation 2000 m), and a plurality of plots in FIG. 2 denote engine operating points during the traveling on urban area streets at the flat land.

For example, in a case where the air density is lowered, the throttle valve opening angle is corrected toward an increase side so as to achieve the engine torque that is expected in a case where the air density is not lowered. Especially, in the hybrid vehicle, it will be appreciated from FIG. 2 that, since the engine operating points which accord with the engine torque that HCM 10 demands at a higher load side at which a fuel consumption is small are frequently used and the marginal torque is small, a width by which the correction for the engine torque can be made according to the correction of the throttle valve opening angle becomes narrowed. In a case where the reduction in the air density is large, there arises a possibility that the engine torque that HCM 10 demands cannot be realized even according to the correction of the throttle valve opening angle.

Therefore, in this embodiment, the target engine torque is corrected in accordance with the air density of an environment under which the vehicle travels and the reduction in the driving force at a time of the reduction in the air density is suppressed and an excessive generation of the driving force at a time of a rise in the air density is prevented. Furthermore, engine 1 and motor 2 are coordinated so that a stepwise difference in the vehicle driving force is not developed when the traveling mode is switched (switching from the HEV traveling mode to the EV traveling mode and switching from the EV mode to the HEV traveling mode) according to a variation in the air density of the environment under which the vehicle travels.

Figure 3:
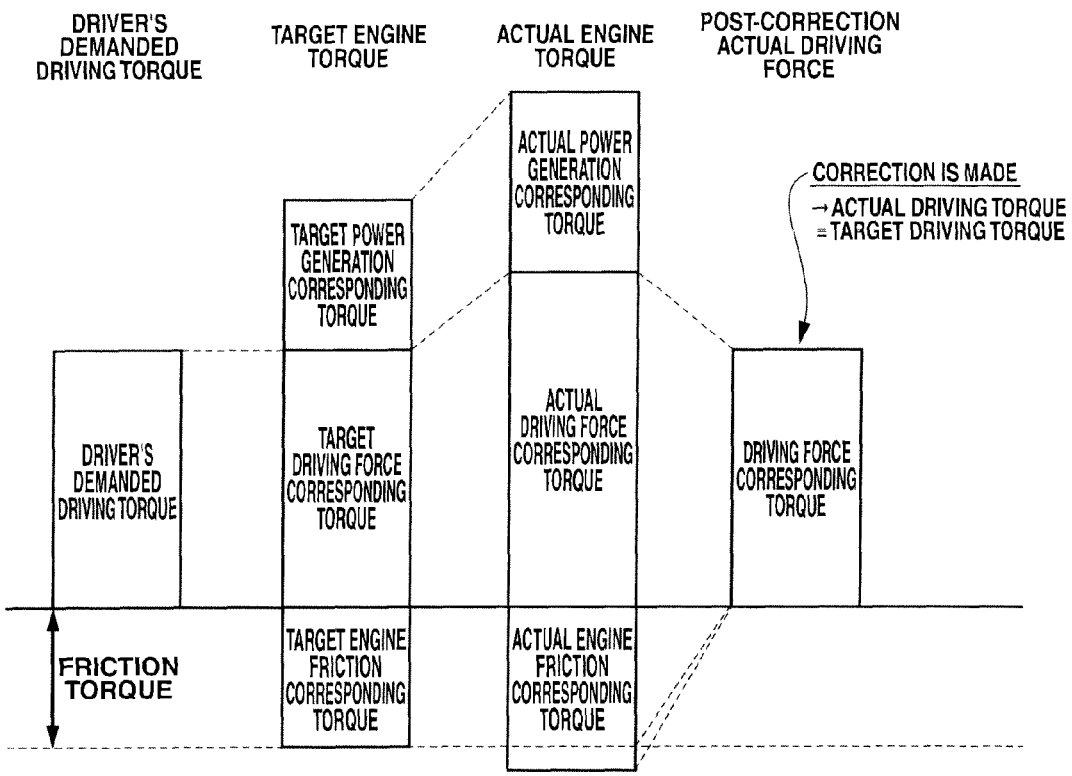
FIG. 3 is an explanatory view representing diagrammatically and roughly a correction of an engine torque in a case where an air density is raised according to the present invention.
Figure 4:
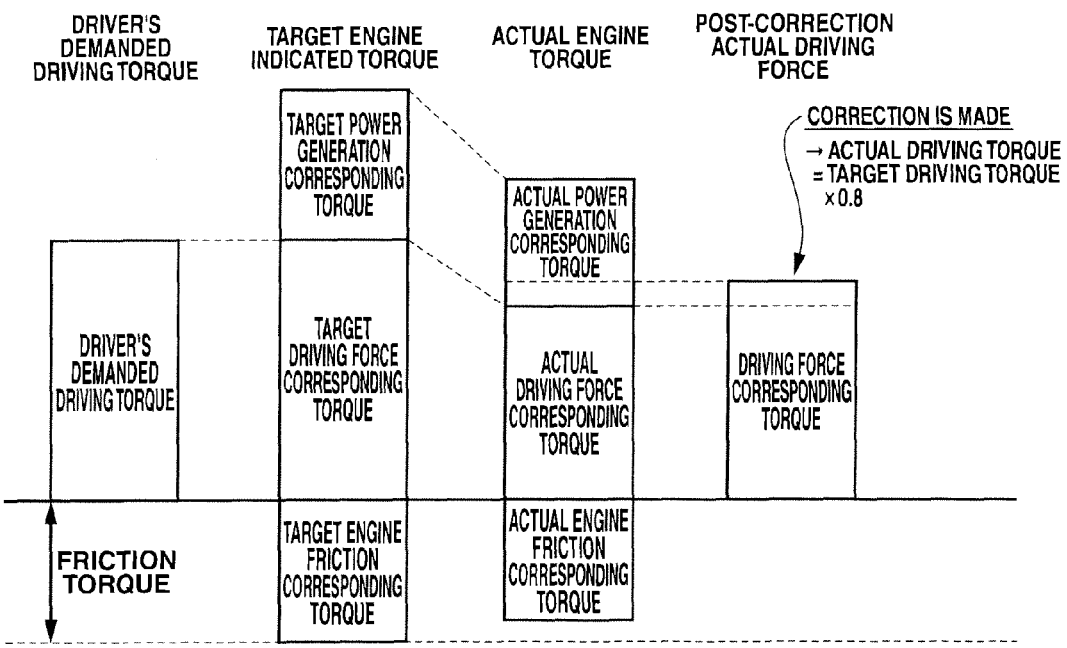
FIG. 4 is an explanatory view representing diagrammatically and roughly the correction of the engine torque in a case where the air density is reduced according to the present invention.
Figure 5:
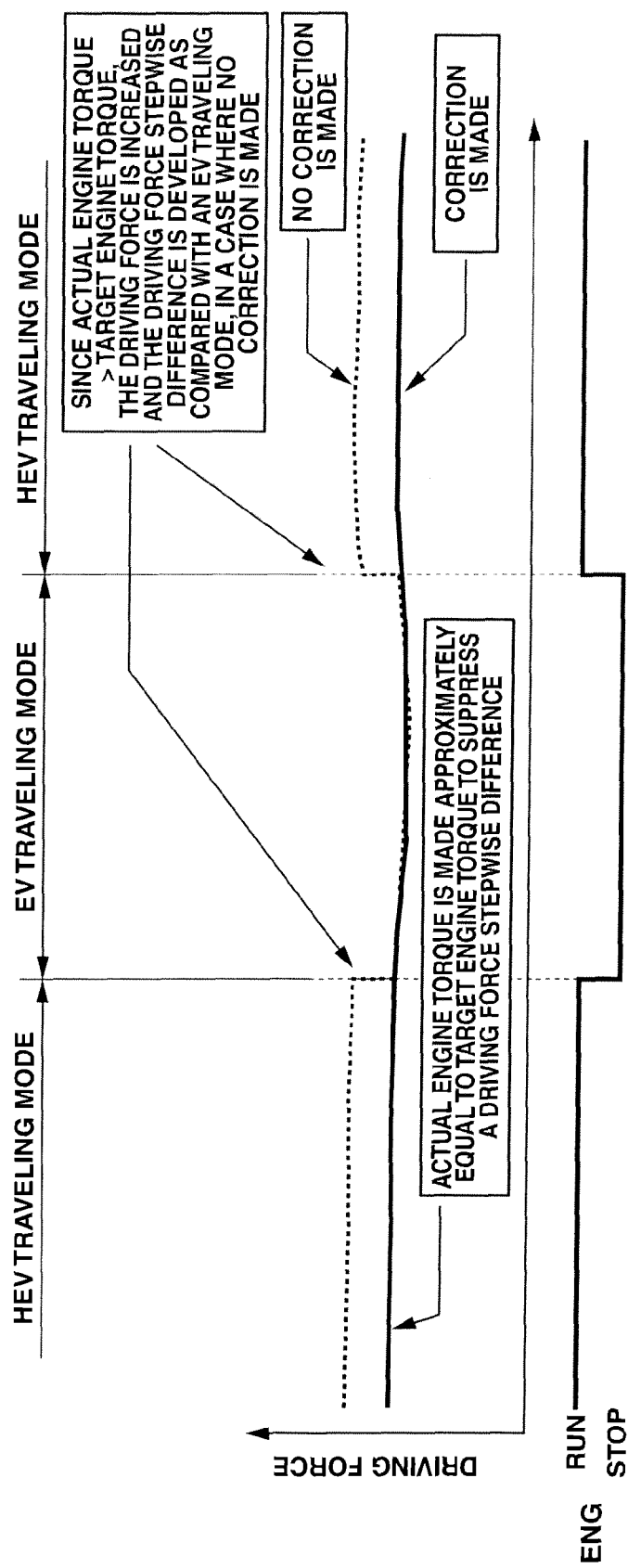
FIG. 5 is an explanatory view representing diagrammatically and roughly a behavior of a driving force when a traveling mode is switched in a case where the air density is raised.

FIGS. 3 and 4 are explanatory views representing diagrammatically rough views of the correction of the engine torque in accordance with the air density exemplifying a case where the vehicle is traveling in the traveling power generation state of the HEV traveling mode and show states in which the engine torque including a target power generation torque to provide for the power generation of motor 2 when a battery charge quantity is reduced. FIG. 3 shows a case where the air density is raised with respect to a standard air density (for example, the air density in a case of the standard atmospheric pressure (101.3 KPa) and in a case of air temperature of 25° C.) and FIG. 4 shows a case where the air density is reduced with respect to the standard air density (for example, the standard atmospheric pressure (101.3 KPa) and in a case of air temperature of 25° C.), respectively.

The target engine torque that engine 1 is actually demanded with respect to a driver's demanded driving torque that the vehicle driver has demanded is an addition of a target power generation corresponding torque required to be generated by motor 2 and a target engine friction corresponding torque with a friction taken into consideration to a target driving force corresponding torque corresponding to the driver's demanded driving torque.

In a case where the air density is raised with respect to the standard air density (for example, in a case where the intake air temperature is reduced due to the travel on the cold area and the air density is raised), an actual driving force corresponding torque of the actual engine torque with respect to the target power generation corresponding torque is increased, an actual engine friction corresponding torque of the actual engine torque is increased with respect to the target engine friction corresponding torque, and an actual engine friction corresponding torque of the actual engine torque for the target engine friction corresponding torque are increased with respect to the target engine friction corresponding torque, as shown in FIG. 3.

For example, in a case where the target driving force corresponding torque is 100 Nm, the target power generation corresponding torque is 100 Nm, the target engine friction corresponding torque is 50 Nm, and the air density is 120% of the standard air density, the actual engine torque is (100+100+50)×1.2=300 Nm. If the air density is raised, the actual engine friction corresponding torque corresponding to the target engine friction corresponding torque is increased and the torque used actually as the frictional corresponding torque is the same as the target engine friction corresponding torque. Hence, the torque actually used for the power generation is the same as the target engine friction corresponding torque. In addition, the actual driving force corresponding torque for the actual engine torque gives 300−100−50=150 Nm, an excessive driving torque of 50 Nm is resulted with respect to 100 Nm of the driver's demanded driving torque (target driving force corresponding torque).

As described hereinabove, when the air density is in excess of the standard air density, the power generation of motor 2 becomes unnecessary since the battery charge quantity is increased so that the traveling mode is switched to the EV traveling mode in which the power of only motor 2 is used as the power source from the traveling power generation state. In this case, the output torque of motor 2 is basically coincident with the driver's demanded driving torque. Hence, an excessiveness of above-described driving torque is abruptly decreased so that the stepwise difference in the driving force is developed.

Therefore, in a case where, in this embodiment, the air density is raised with respect to the standard air density, the opening angle of throttle valve (not shown) in accordance with the rise in the air density is adjusted (decrease correction) so that the target engine torque is corrected toward the decrease side. The driving force corresponding torque and the driver's demanded driving torque which are obtained after this correction are mutually made equal to each other.

Specifically, the target driving force corresponding torque is decreasingly corrected such that the actual driving force corresponding torque becomes equal to the driver's demanded driving torque, the target power generation corresponding torque in a case where the air density is raised is decreasingly corrected such that the actual power generation corresponding torque becomes equal to the target power generation corresponding torque when the air density is the standard air density, and the target engine friction corresponding torque in a case where the air density is raised is decreasingly corrected such that the actual engine friction corresponding torque becomes equal to the target engine friction corresponding torque when the air density is the standard air density.

Thus, since the actual engine torque is made equal to the target engine torque and the driver's demanded driving torque is made coincident with the driving force corresponding torque after this correction (post-correction driving force corresponding torque), even if the air density is raised with respect to the standard air density, the motor torque in the EV traveling mode, namely, the actual driving force corresponding torque (the driver's demanded driving torque) is substantially coincident with the (post-correction) driving force corresponding torque after the correction in the HEV traveling mode and a development of the stepwise difference between these torques can be prevented from occurring.

On the other hand, in a case where the air density is reduced with respect to the standard air density (for example, in a case where the atmospheric pressure is reduced and the air density is reduced due to the traveling at the high land), as shown in FIG. 4, the actual driving force corresponding torque of the actual engine torque with respect to the target driving force corresponding torque is decreased, the actual power generation corresponding torque of the actual engine torque with respect to the target driving force corresponding torque is decreased, and the actual engine friction corresponding torque of the actual engine torque with respect to the target engine friction corresponding torque is decreased.

For example, in a case where the target driving force corresponding torque is 100 Nm, the target power generation corresponding torque is 100 Nm, the target engine friction corresponding torque is 50 Nm, and the air density is 80% of the standard air density, the actual engine torque indicates (100+100+50)×0.8=200 Nm. If the air density is reduced, the actual engine friction corresponding torque corresponding to the target engine friction corresponding torque is decreased. However, the torque actually used for the friction is the same as the target engine friction corresponding torque. In addition, the torque used for the power generation is the same as the target power generation corresponding torque. Hence, the actual driving force corresponding torque of the actual engine torque indicates 200−100−50=50 Nm. Hence, an insufficient driving torque of 50 Nm with respect to 100 Nm of the driver's demanded driving torque (target driving force corresponding torque) is resulted.

As described above, in a case where, when the air density is reduced and is lower than the standard air density, the charge quantity of the battery is increased, the power generation of motor 2 is not necessary, and the traveling mode is switched from the traveling power generation state to the EV traveling mode in which the power of only motor 2 is used as the driving source, the output torque of motor 2 is basically coincident with the driver's demanded driving torque. Thus, the insufficient part of the driving torque described above is abruptly eliminated so that the stepwise difference occurs in the driving force.

Therefore, in this embodiment, in a case where the air density is reduced with respect to the standard air density, a correction such that part of the actual power generation corresponding torque is allocated to the actual driving force corresponding torque is made to suppress the reduction in the actual driving force corresponding torque.

In details, in a case where the air density is reduced with respect to the standard air density during the travel of the vehicle in the traveling power generation state of the HEV traveling mode, the power generation load of motor 2 is reduced and a rate of the actual power generation corresponding torque occupied in the actual engine torque is relatively reduced so that the rate of the actual driving force corresponding torque occupied in the actual engine torque is relatively raised to suppress the reduction in the (post-correction) driving force corresponding torque obtained after the correction. In this embodiment, the power generation load of motor 2 is reduced so that, for example, the (post-correction) driving force corresponding torque obtained after the correction indicates the torque corresponding to 80% of the driver's demanded driving torque.

In addition, in a case where the air density is reduced with respect to the standard air density, the motor torque of motor 2 when the vehicle travels in the EV traveling mode is reduced such that the motor torque becomes equal to the (post-correction) driving force corresponding torque in the HEV traveling mode after the correction in a case where the air density is reduced with respect to the standard air density. In other words, in a case where the air density is reduced with respect to the standard air density, the output of motor 2 is reduced with respect to the output of motor 2 corresponding to the driver's demanded driving torque when the air density is the standard air density, when the vehicle travels in the EV traveling mode.

Figure 6:
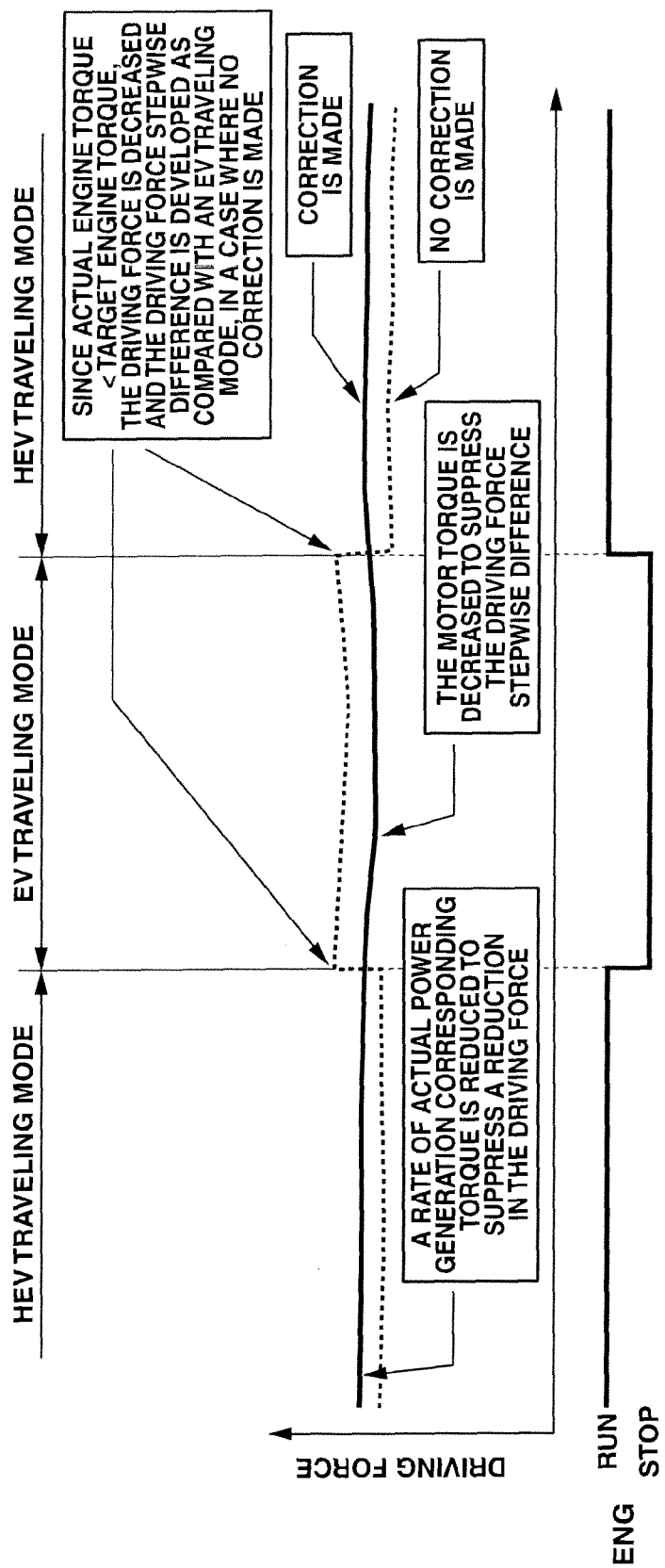
FIG. 6 is an explanatory view representing diagrammatically and roughly a behavior of the driving force when the traveling mode is switched changed in a case where the air density is reduced.

Thus, in a case where the air density is reduced with respect to the standard air density, the power generation load of motor 2 is reduced in the HEV traveling mode, the rate of the actual power generation corresponding torque occupied in the engine torque is reduced, and the motor torque in the EV traveling mode is corrected so as to be reduced in synchronization with the reduction of the driving force corresponding torque in the HEV traveling mode. Consequently, at a timing at which the traveling mode is switched, as shown in FIG. 6, the stepwise difference in the driving force between the motor torque in the EV traveling mode, namely, the actual driving force corresponding torque (driver's demanded driving torque) and the (post-correction) driving force corresponding torque after the correction in the HEV traveling mode can be prevented from occurring.

In more details, a compatibility between a separation of the driving torque actually used to drive the vehicle from the driver's demanded driving torque which is to be as small as possible and an elimination of the stepwise difference of the driving force when the traveling mode is switched between the HEV traveling mode and the EV traveling mode can be established in respectively suitable modes between the cases when the air density is relatively reduced and when the air density is relatively raised.

Especially, the power generation becomes necessary when the battery charge quantity is reduced, in spite of the fact that the engine torque cannot be increased when the air density is reduced and is lower than the standard air density, and it is necessary for the traveling state to be forced in the traveling power generation state of the HEV traveling mode.

At this time, it becomes necessary to switch the traveling mode between the traveling power generation state of the HEV traveling mode and the EV traveling mode when the air density is reduced. However, in this embodiment, the motor torque in the EV traveling mode is reduced in synchronization with the reduction of driving force corresponding torque in the HEV traveling mode so that an energy consumption stored in the battery in the EV traveling mode can be suppressed.

Hence, the motor torque in the EV traveling mode matches with the reduction in the power generation load of motor 2 in the traveling power generation state of the HEV traveling mode without contradictions and the stepwise difference in the driving force can be suppressed while a frequency of switching of the traveling mode is reduced. In other words, in the traveling power generation state of the HEV traveling mode, the rate of the actual power generation corresponding torque occupied in the actual engine torque is relatively reduced so that the rate of the actual driving force corresponding torque occupied in the actual engine torque is relatively raised. Consequently, the power generation load in motor 2 to suppress the reduction in the driving force corresponding torque obtained after the correction matches with the suppression of the consumption of the energy stored in the battery due to the reduction in the motor torque in the EV traveling mode which meets with the reduction of the driving force corresponding torque in the HEV traveling mode and the stepwise difference in the driving force can be suppressed while the frequency of switching of the traveling mode is reduced. In other words, in a case where the air density is reduced, even if all of the insufficient part of the output of the engine due to the reduction in the air density are not adjusted in the torque control at the motor side, the stepwise difference in the vehicle driving force when the traveling mode is switched between the HEV traveling mode and the EV traveling mode can be suppressed.

In details, in a case where the air density is reduced and is lower than the standard air density, the motor output in the EV traveling mode is reduced with respect to the motor output when the air density is not reduced and is not lower than the standard air density. Hence, in a case where the HEV traveling mode is in the motor assistance traveling state, without compensation by the torque control of motor 2 such that all of an insufficient part of the engine output (output reduction part) due to the reduction in the air density to be lower than the standard air density are assisted by the torque control of motor 2 (the power consumption of motor 2 is increased), the stepwise difference in the vehicle driving force when the traveling mode is switched between the HEV traveling mode and the EV traveling mode can be eliminated or relieved. In addition, in a case where the HEV traveling mode is in the traveling power generation state, without compensation by the torque control of motor 2 such that all of the insufficient part of the engine output (output reduction part) due to the reduction in the air density to be lower than the standard air density are compensated for by the torque control of motor 2 (the power generation quantity of motor 2 is decreased), the stepwise difference in the vehicle driving force when the traveling mode is switched between the HEV traveling mode and the EV traveling mode can be eliminated or relieved.

In more details, when the stepwise difference in the vehicle driving force when the traveling mode is switched between the HEV traveling mode and the EV traveling mode is eliminated or relieved, the increase in the power consumption of motor 2 in the HEV traveling mode can be suppressed and the insufficient power generation of motor 2 in the HEV traveling mode can be suppressed, as compared with the case where all of the insufficient part of output of the engine (output reduction part) due to the reduction in the air density to be lower than the standard air density are compensated for by the torque control of motor 2.

Figure 7:
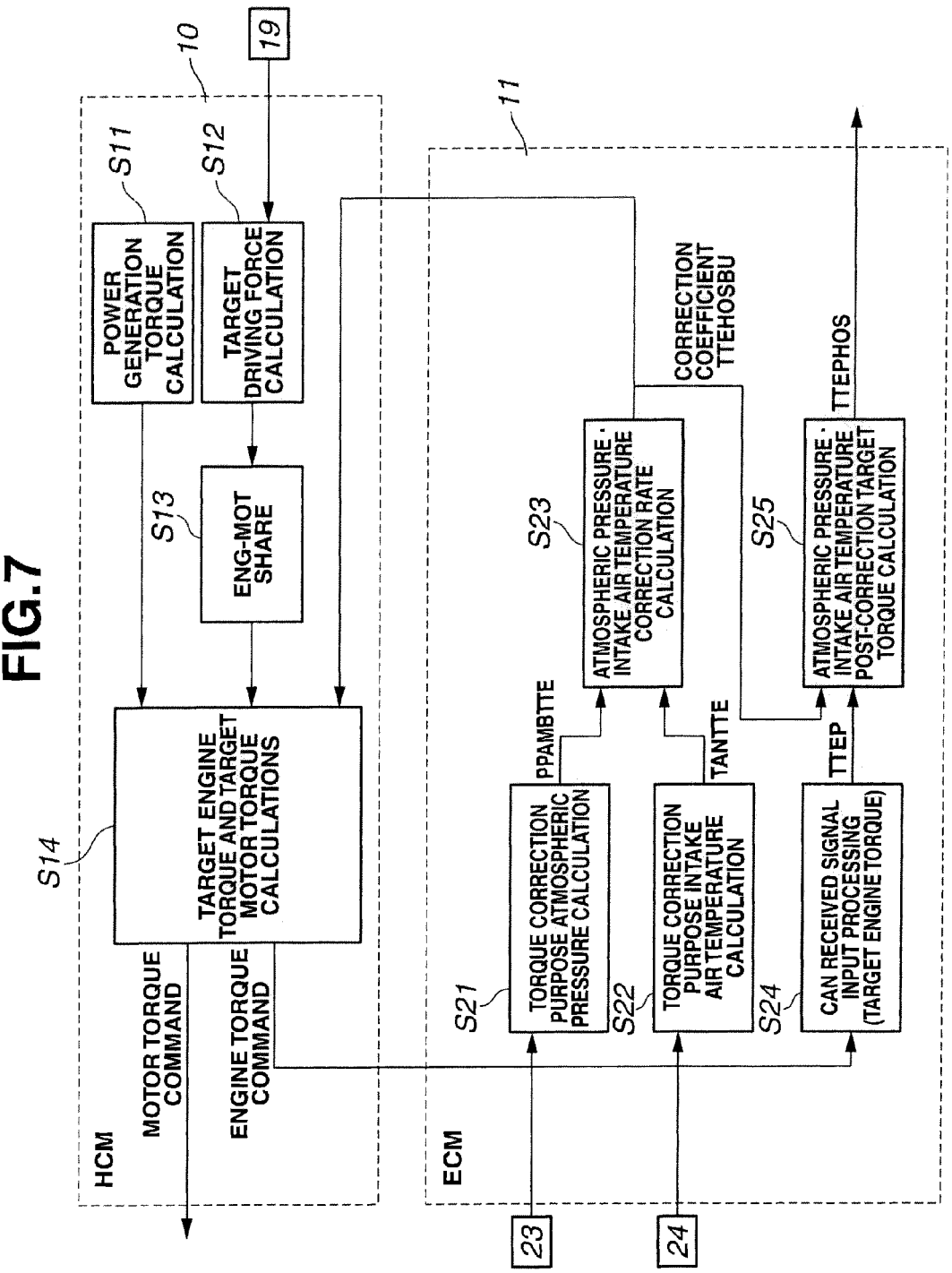
FIG. 7 is an explanatory view representing diagrammatically and roughly a flow of calculation of a torque commands toward the engine and the motor.

FIG. 7 is an explanatory view diagrammatically representing flow of calculations in the torque command to engine 1 and torque command to motor 2.

ECM 11 calculates a correction coefficient TTEHOSBU corresponding to the air density using the atmospheric pressure and the intake air temperature. Then, the driving force developed in engine 1 is corrected using correction coefficient TTEHOSBU in ECM 11. In addition, the driving force developed in motor 2 is corrected using correction coefficient TTEHOSBU calculated in ECM 11. Steps S11 through S14 are processes carried out in HCM 10 and steps S21 through S25 are processes carried out in ECM 11.

At S11, HCM 10 calculates a power generation torque (a power generation load) required for the power generation at motor 2 in a case where the power generation at motor 2 is carried out in accordance with the charge quantity (SOC) of the battery described above.

At step S12, HCM 10 calculates the target driving force of the vehicle in accordance with the accelerator opening angle. That is to say, at step S12, HCM 10 calculates the target driving force corresponding to the target engine torque developed at engine 1 in the engine traveling state of the HEV traveling mode and in the traveling power generation state of the HEV traveling mode, calculates the target driving force corresponding to a sum between the target engine torque developed in engine 1 in the motor assistance traveling state of the HEV traveling mode and the motor torque (driving assistance purpose) developed in motor 2, or calculates the target driving force corresponding to the motor torque (driving purpose) developed at motor 2 in the EV traveling mode.

At step S13, the target driving force calculated at S12 is shared into engine 1 and motor 2. That is to say, HCM 10 determines a share for engine 1 and the share for motor 2 from among the target driving forces.

At step S14, HCM 10 outputs the engine torque command to ECM 11 and the motor torque command to MC 12 using the air density information (correction coefficient TTE-HOSBU) from S23 as will be described later. It should be noted that the motor torque command is a torque command value corrected in accordance with the necessity on a basis of the air density information. On the other hand, the engine torque command is not the command value based on the air density information but is the torque command value corresponding to the target engine torque.

At S21, ECM 11 calculates a torque correction purpose atmospheric pressure PPAMBTTE on a basis of the input signal from atmospheric pressure sensor 23. It should be noted that, in place of atmospheric pressure sensor 23, a purge line pressure on a purge line which extends from a fuel tank (not shown) to a purge control valve via a canister (not shown) processing vaporized fuel can be referred to as the atmospheric pressure. However, in this case, the calculation of the atmospheric pressure is allowed only when the purge control valve is continuously closed for a predetermined time or longer. It should be noted that the vapor fuel adsorbed onto the canister is introduced into the intake air passage when the purge control valve is in an open state.

At S22, ECM 11 calculates a torque correction purpose intake air temperature TANTTE on a basis of the input signal from intake air temperature 24. This torque correction purpose intake air temperature TANTTE is calculated with an influence of an ambient temperature of engine 1 taken into consideration.

At S23, ECM 10 calculates a torque correction coefficient TTEHOSBU which is a correction rate of the atmospheric pressure and intake air temperature using torque correction purpose atmospheric pressure PPAMBTTE and torque correction purpose intake air temperature TANTTE. This atmospheric pressure and intake air temperature correction rate is a correction value corresponding to the air density of the environment under which the vehicle travels and S23 corresponds to an air density detecting section.

Figure 8:
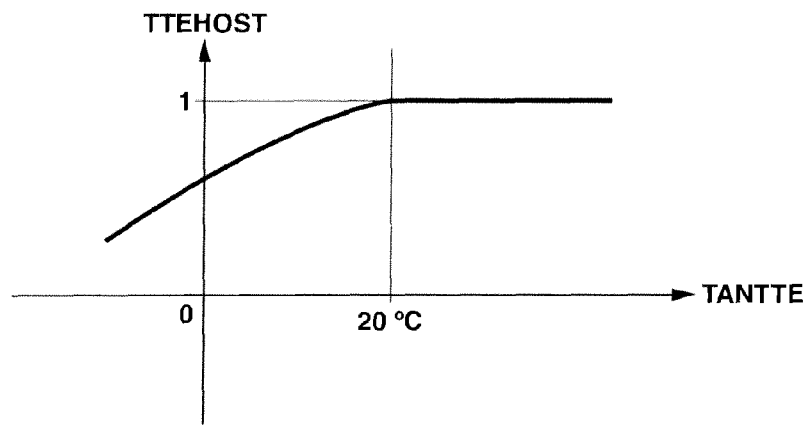
FIG. 8 is a calculation table of an intake air temperature correction coefficient TTEHOST.
Figure 9:
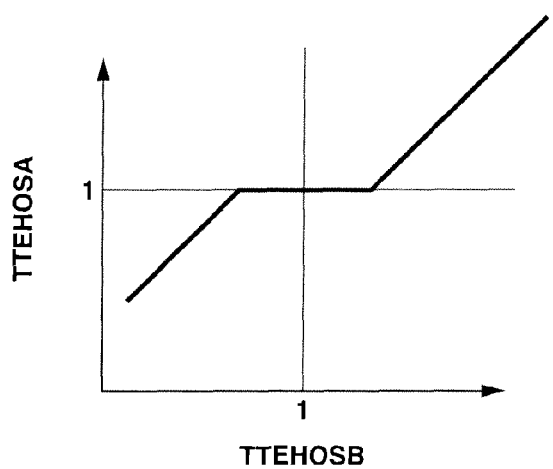
FIG. 9 is a calculation table of a correction value TTEHOSA.

At this S23, ECM 11 calculates basic correction coefficient TTEHOSB by multiplying an atmospheric pressure correction coefficient TTEHOSP, which is a division of the standard atmospheric pressure (101.3 KPa) by a torque correction purpose atmospheric pressure PPAMBTTE, by an intake air temperature correction coefficient TTEHOST calculated using the torque correction purpose intake air temperature TANTTE and a TTEHOST calculation table shown in FIG. 8. Then, a rate limit processing is carried out for correction value TTEHOSA which is a value obtained by the correction made for this basic correction coefficient TTEHOSB with a dispersion of sensor values taken into consideration to obtain a torque correction coefficient TTEHOSQBU. Correction value TTEHOSA is calculated using TTEHOSA calculation table shown in FIG. 9.

In addition, the rate limit processing is carried out to suppress a torque stepwise difference due to the variation of torque correction coefficient TTEHOSBU at the time of updating of the atmospheric pressure and the intake air temperature. It should be noted that torque correction coefficient TTE-HOSBU is a value which becomes smaller as the air density value becomes larger.

At S24, the target engine torque calculated at S14 in HSM 10 is inputted as the engine torque command. Target torque TTEP based on this command is outputted to S25. This target torque TTEP corresponds to the sum of the target driving force torque of engine 1, the target engine friction corresponding torque, and the target power generation torque.

Figure 10:
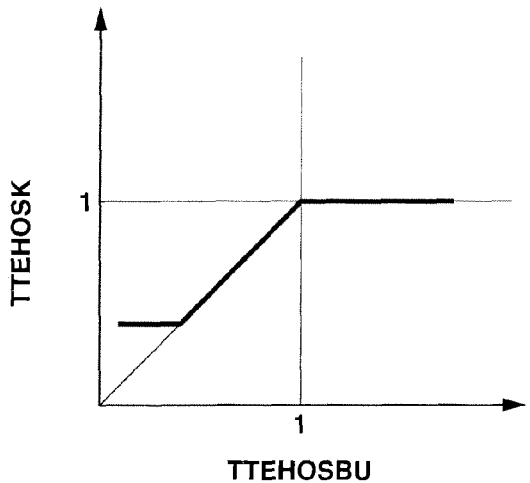
FIG. 10 is a calculation table of an actual correction rate TTEHOSK.

At S25, ECM 11 corrects target torque TTEP using torque correction coefficient TTEHOSBU to calculate a post-correction target torque TTEPHOS. In this embodiment, the correction of the engine torque is made only when the air density is higher than the standard air density. Hence, using a TTE-HOSK calculation table shown in FIG. 10, an actual correction rate TTEHOSK is calculated from torque correction coefficient TTEHOSBU and a post-correction target torque TTEPHOS is calculated by multiplying target torque TTEP by actual correction rate TTEHOSK. The target throttle opening angle is, then, set from this post-correction target torque TTEPHOS.

It should be noted that, in a case where the vehicle is in the engine traveling state or in the motor assistance traveling state when the air density is reduced with respect to the standard air density during the traveling of the vehicle in the HEV traveling mode, the reduction in the actual driving torque of engine 1 is compensated for by the increase in the motor torque so that the reduction in the vehicle driving force with respect to the driver's demanded driving torque can be suppressed. It should, herein, be noted that it is not necessary to increase the motor torque so as to compensate for all of the reduction in the actual driving torque of engine 1 due to the reduction in the air density but the motor torque may, for example, be increased to compensate for a part (a predetermined rate) of the reduction in the actual driving torque caused by the reduction in the air density. Then, in the EV traveling mode, the correction to reduce the output of motor 2 is made so that no stepwise difference in the driving force of the vehicle occurs when the traveling mode is switched between the HEV traveling mode and the EV traveling mode.

Then, in the embodiment described above, the adjustment of the output (torque) of engine 1 is made through the throttle opening angle. Simultaneous adjustments of the throttle valve opening angle, an ignition timing of engine 1, and an open timing of intake valve(s) in a case where engine 1 is provided with a variably operated valve mechanism are made so that the output (torque) of engine 1 may be adjusted.

In addition, when, in the above-described embodiment, the traveling mode is switched between the HEV traveling mode and the EV traveling mode, the stepwise difference in the vehicle driving force does not occur. However, the present invention is not limited to this example in which the stepwise difference in the vehicle driving force when the traveling mode is switched does not occur. That is to say, the stepwise difference of the vehicle driving force when the traveling mode is switched may be corrected so as to be small. Even in this case, it is possible not to give an unpleasant feeling to the vehicle driver when the traveling mode is switched.

Furthermore, in the above-described embodiment, the standard air density may be a predetermined single value or may be all of values within a predetermined range.

In other words, in a case where the standard air density is all of the values within a predetermined standard range, a determination that the detected air density is reduced with respect to the standard air density may be made when the value of the detected air density is reduced exceeding the predetermined standard range, a determination that the detected air density is raised with respect to the standard air density may be made when the value of the detected air density is raised exceeding the predetermined standard range, and a determination that the detected air density is made coincident with the standard air density may be made if the detected air density is within the predetermined standard range.

In a case where the vehicle travels at the high land, the air density is lowered as compared with the low land. Hence, the output of engine 1 is reduced and the driving torque of the vehicle is relatively lowered. On the other hand, the output of motor 2 does not receive the influence of the air density. Therefore, in the hybrid vehicle having engine 1 and motor 2 as the driving sources of the vehicle, the stepwise difference in the vehicle driving force occurs when the air density is varied. Thus, when the traveling mode is switched while the air density is varied, the stepwise difference is developed in the vehicle driving force. Hence, in this embodiment described above, as already described, engine 1 is coordinated with motor 2 so as not to generate the stepwise difference in the vehicle driving force.

As the vehicle having only the engine as the driving source and the hybrid vehicle having the engine and the motor/generator as the driving sources are compared with each other, there are often cases where the reduction of the driving force in the hybrid vehicle becomes large at the high land at which the air density is reduced although the driving torque that each of the vehicles is demanded is the mutually same.

FIG. 11 is an explanatory view diagrammatically representing a difference in the actual engine torque (a torque that the engine actually outputs) due to the difference in the air density in the vehicle having only the engine as the driving source. FIG. 12 is an explanatory view representing diagrammatically the difference in the actual engine torque (the torque that the engine actually outputs) due to the difference in the air density in a case where the engine torque includes the driving torque of the vehicle transmitted to the driving wheels and the power generation torque which provides for the power generation by the motor in the hybrid vehicle equipped with the engine and the motor as the driving sources.

In FIG. 11, during the traveling at the low land (ordinary) in which the air density is high, target engine torque Te* (engine friction torque Tfric is not included) follows vehicular target driving torque Td*. At this time, the torque that the engine actually outputs (actual engine torque Te1) is a value including engine friction Tfric. Then, when the driving condition except the air density is the same, actual driving torque Td1 provides a value smaller than vehicle target driving torque Td* by $\Delta T1$ when the vehicle travels at the high land at which the air density is low. At this time, actual engine torque Te2 which is the torque actually outputted by the engine provides a value smaller than actual engine torque Te1 at the low land (ordinary) at which the air density is high by $\Delta T1$. It should be noted that actual driving torque Td1 at this time is a quantity divided by engine friction Tfric from actual engine torque Te2.

In FIG. 12, during the traveling at the low land (ordinary) at which the air density is high, target engine torque Te* (which does not include engine friction Tfric) follows vehicle target driving toque Td*. The torque that the engine actually outputs at this time (actual engine torque Te3) provides a value including engine friction Tfric and power generation torque Tp which provides for the power generation at the motor. Then, when the driving condition except the air density is the same during the traveling at the high land at which the air density is low, the torque (actual engine torque Te4) that the engine actually outputs provides a value smaller than actual engine torque Te3 at the low land (ordinary) at which the air density is high by $\Delta T2$. Actual driving torque Td2 at this time provides a quantity which is a subtraction of engine friction Tfric and power generation torque Tp from actual engine torque Te4.

It should be noted that, although a rate of reduction of actual engine torque Te due to the reduction in the air density is constant, power generation torque Tp is constant irrespective of the air density. If target driving torque Td* in FIG. 11 is the same value as target driving toque Td* in FIG. 12, actual engine torque Te3 is larger than actual engine torque Te1 by a quantity corresponding to an addition of power generation torque Tp to target engine torque Te*. Hence, the reduction quantity of the torque when the air density is reduced becomes larger ($\Delta T2 > \Delta T1$).

Therefore, in a second preferred embodiment according to the present invention, in a case where the reduction quantity of actual engine torque Te due to the reduction in the air density cannot be suppressed in the hybrid vehicle, power generation torque Tp is suppressed to suppress the reduction quantity of actual driving torque Td to secure a driveability and the engine and the motor are coordinated with each other to secure a balance between a power use quantity when the motor assists the vehicle driving force and a power supply quantity of the electric power according to the power generation of the motor. In other words, the motor assistance torque and the power generation torque are corrected so that a balance between an acceleration of the motor and a regeneration of the motor in a certain driving pattern provides constant regardless of whether the vehicle travels at the high land and at the low land.

If engine output correction coefficient at the high land with respect to the low land is $\alpha$, the torque (actual engine torque) Te that the engine actually outputs provides $Te=(Te^*+Tfric)\times \alpha-Tfric$ if the target engine torque is Te* and engine friction torque is Tfric. It should be noted that, according to the present invention, the driving torque outputted to the driving wheels is assumed to be reduced at the same rate. In other words, actual driving torque Td provides $Td=(Td^*+Tfric)\times \alpha-Tfric$. Motor torque Tg, at this time, provides $Tg=Td-Te=((Td^*+Tfric)\times \alpha-Tfric)-((Te^*+Tfric)\times \alpha-Tfric)=(Td^*-Te^*)\times \alpha$.

In other words, required motor torque Tg is reduced at the same rate with respect to a value of (Td*−Te*) required at the low land. That is to say, in a case where the engine torque is reduced, the driving force of the vehicle is also reduced and the driving torque is not compensated for by the motor. In addition, in the second embodiment, the output is reduced at the same correction rate for the power generation by means of the motor and the assistance of the driving force by means of the motor. It should, however, be noted that it is not always necessary to reduce the power generation by means of the motor and the assistance of the driving force by means of the motor at the same correction rate, if the balance between the power use quantity when the motor assists the vehicular driving force and the power supply quantity of the electric power according to the power generation by means of the motor can be secured.

Figure 13:
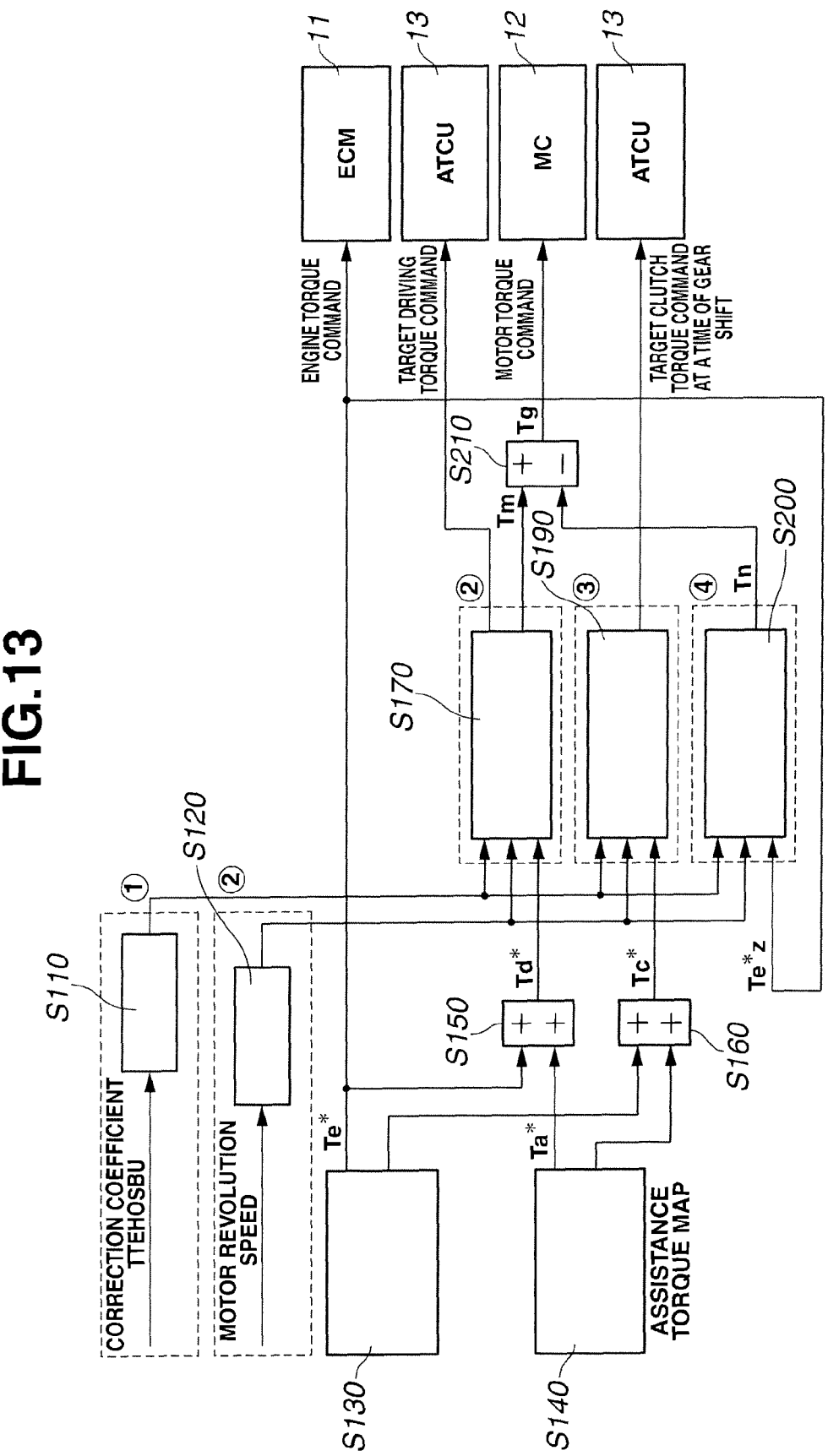
FIG. 13 is an explanatory view representing diagrammatically a flow of a calculation procedure within the HCM hybrid control module in a second preferred embodiment according to the present invention.

FIG. 13 is an explanatory view diagrammatically representing flows of calculations of the torque commands within HCM 10 in the second embodiment according to the present invention and representing flow of calculations of the engine torque command to be outputted to ECM 11, the motor torque command outputted to MC 12, and the target driving torque command and the target clutch torque command during the gear shift to be outputted to ATCU 13. It should be noted that, in this second embodiment, the series of processes of the engine torque command in ECM 11 are the same as those in the above-described first embodiment (the same as S21 through S25 in FIG. 7) so that the duplicate explanations on the flows of calculations in ECM 11 will, herein, be omitted.

In this second embodiment, at S110 (the details will be described later), HCM 10 calculates an engine torque reduction rate with a variation rate limitation provided for correction coefficient TTEHOSBU inputted from ECM 11 not to make an abrupt change in the driving force. Then, HCM 10 corrects target driving torque Td* at S170 (the details will be described later), corrects target driving torque Tc* after gear shift at S190 (the details will be described later), and corrects a command value based engine torque estimation value (a previous value Te*Z of target engine torque Te*) to determine the power generation and the assistance torque by means of motor 2 at S200 (the details will be described later).

Figure 14:
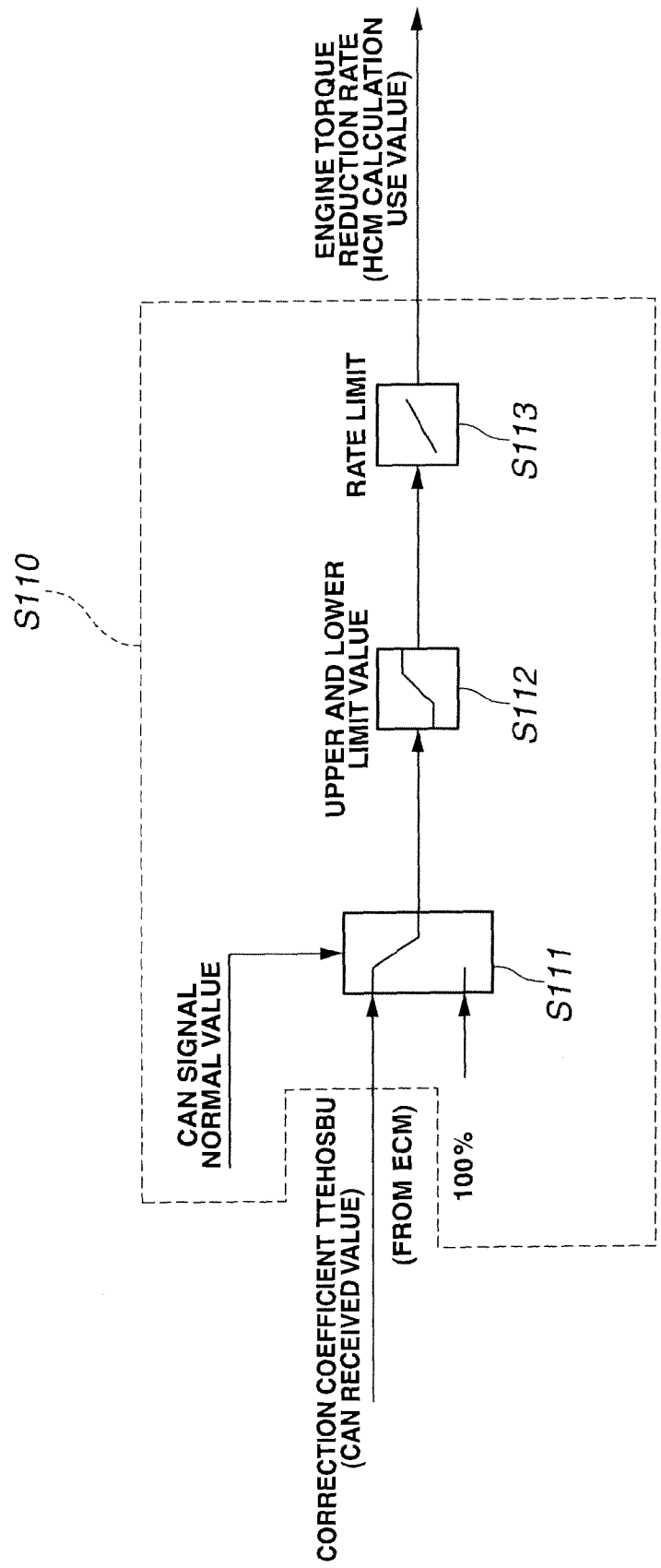
FIG. 14 is an explanatory view representing diagrammatically details of the calculation procedure of an engine torque reduction rate.

At S110, HCM 10 calculates the engine torque reduction rate using correction coefficient TTEHOSBU which is the air density information calculated within ECM 11 and inputted as a CAN signal via communication line 14. The flow of the calculation of the engine torque reduction rate within S110 will be described in details below with reference to FIG. 14.

At S111, HCM 10 determines whether a CAN signal equivalent to inputted correction coefficient TTEHOSBU has a normal value or not. If determines to be the normal value, inputted correction coefficient TTEHOSBU is used. If determines not to be the normal value, inputted correction coefficient TTEHOSBU is not used but replaced with 100% (namely, "1"). In details, when a communication abnormality between ECM 11 and HCM 10 using communication line 14 occurs or when the failure in atmospheric pressure sensor 23 or intake air temperature 24 occurs, value of inputted correction coefficient TTEHOSE is replaced with 100% so that a substantial correction is not made.

At S112, a limitation of upper and lower values is set for inputted correction coefficient TTEHOSBU. The limitation of upper and lower values are, for example, set so that the upper limit value is 100% and the lower limit value is 60%. Since, for the upper limit value, ECM 11 side corrects correction coefficient TTEHOSBU such that, in a case where the engine torque is increased, 100% may be set. For the lower limit value, the lower limit value may be set to be smaller as a maximum altitude at which the vehicle is assumed to travel is set to be higher.

At S113, HCM 10 places a limitation on a variation speed of inputted correction coefficient TTEHOSBU. At this S113, the variation rate limitation of, for example, 0.03 (%/sec) is set. It should be noted that the limitation of the variation rate of 0.03(% sec) is set from the variation rate in a case where the vehicle is continued to be climbed on an ascending slope of 10% at the speed of 100 km/h.

In this way, the limitation of the upper and lower values and the limitation of the variation speed are set for correction coefficient TTEHOSBU. Even if the failure and communication abnormalities on atmospheric pressure 23 and intake air temperature sensor 24 occur, the driveability can be secured.

At S120, HCM 10 calculates driving force correction purpose engine friction by referring to an engine friction calculation table (not shown) from a revolution speed of motor 2. The engine friction calculation table is set in such a way that, for example, as the revolution speed of motor 2 becomes faster, the calculated driving force correction purpose engine friction becomes larger. It should be noted that, in this embodiment, at step S120, the driving force correction purpose engine friction is set to be a negative value. The value calculated at S120 is outputted as the negative value.

At S130, HCM 10 calculates target engine torque Te* by referring to a target engine torque calculation map (not shown) from the engine speed and the accelerator opening angle. The target engine torque calculation map is set in such a way that, for example, as the accelerator opening angle becomes larger, the calculated engine torque becomes larger. Then, in this second embodiment, target engine torque Te* calculated at S130 is outputted to ECM 11 as an engine torque command without correction by means of correction coefficient TTEHOSBU. It should be noted that the process of target engine torque Te* within ECM 11 is the same as the first embodiment described above.

At S140, HCM 10 calculates a target assistance torque Ta* by referring to a target assistance torque calculation map (not shown) from the engine speed and the accelerator opening angle. The target assistance torque calculation map is set in such a way that, for example, as the accelerator opening angle becomes larger, the calculated engine torque becomes larger.

Then, at S150, HCM 10 adds target engine torque Te* and target assistance torque Ta* to derive target driving torque Td*.

Then, at S160, HCM 10 adds target engine torque Te* and target assistance torque Ta* to derive a target clutch torque at a time of gear shift Tc*.

it should, herein, be noted that target engine torque Te* and target assistance torque Ta* inputted to S150 are values calculated on a basis of a present engine speed and target assistance torque Te* and target assistance torque Ta* inputted to S160 are values calculated on a basis of the engine speed after the gear shift occurs.

At step S170, HCM 10 calculates a target input torque Tm to be outputted to S120 using the engine torque reduction rate calculated at S110, the driving force correction purpose engine friction calculated at S120, and target driving torque Td* calculated at S150. Furthermore, at S170, HCM 10 calculates the target driving torque command which is the torque command value for second clutch 7 using the engine torque reduction rate calculated at S110, the driving force correction purpose engine friction calculated at S120, and target driving torque Td* calculated at S150 and outputs this target driving torque command to ATCU 13.

The details will be described below with reference to FIG. 15. Target input torque Tm is calculated as the result of series of processes at S171 through S175 and the target driving torque command is calculated as the result of series of processes at S176 through S180.

Target input torque Tm is a value derived by multiplying the value of the addition of driving force correction purpose engine friction to target driving torque Td* (S171) by the engine torque reduction rate (S172) and by adding the multiplication result to the driving force correction purpose engine friction (subtraction) (S173). It should be noted that the driving force correction purpose engine friction is set to be the negative value at S120. Hence, actually, the driving force correction purpose engine friction at S171 as described above is added and at S173 the driving force correction purpose engine friction is subtracted. Then, in a case where the present gear shift stage of automatic transmission 3 is a gear stage (for example, first speed) in which the one-way clutch is intervened, target input torque Tm provides no negative torque at S175 and is outputted as target input torque Tm. In details, at S174, the value obtained at S173 is compared with "0" and one of the values which is larger than the other is outputted to S175. In a case where the present gear shift stage of automatic transmission 3 is the gear shift stage (for example, first speed) in which the one-way clutch is intervened), not the value obtained at S173 but the value outputted from S174 to S175 is taken as target input torque Tm.

The target driving torque command is derived by multiplying the addition value of driving force correction purpose engine friction to target driving torque Td* (S176) by the engine torque reduction rate (S177) and by adding (subtracting) the driving force correction purpose engine friction to the multiplication result (at S178). Then, in a case where the present gear shift stage of automatic transmission 3 is the gear shift stage (for example, first speed) in which the one-way clutch is intervened, the command value of the target driving torque command is outputted without giving the negative torque value at S180. In details, at S179, HCM 10 compares the value obtained at S178 with "0" so that the larger one of the obtained values is outputted to S180. If the present gear shift stage of automatic transmission 3 is the gear shift stage (for example, first speed) in which the one-way clutch is intervened, the value obtained at S178 is not outputted but the value outputted from S179 to S180 is outputted as the target driving torque command.

Target driving torque Td* used to calculate target input torque Tm is subjected to the process to protect automatic transmission 3 such that, in a case where the value calculated at S150 becomes equal to or larger than a preset predetermined upper limit value, this upper limit value provides target driving torque Td*. In addition, the correction using the engine torque reduction rate at S170 is always carried out during the traveling so as to suppress the driving force step-wise difference between the EV traveling mode and the HEV traveling mode.

At S190, HCM 10 calculates the target clutch torque command at the time of gear shift which is the torque command value at the time of gear shift for automatic transmission 3 using the engine torque reduction rate calculated at S110, the driving force correcting engine friction calculated at S120, and target clutch torque Tc* at the time of gear shift calculated at S160 and outputs the calculated target clutch torque command at the time of gear shift to ATCU 13.

Figure 16:
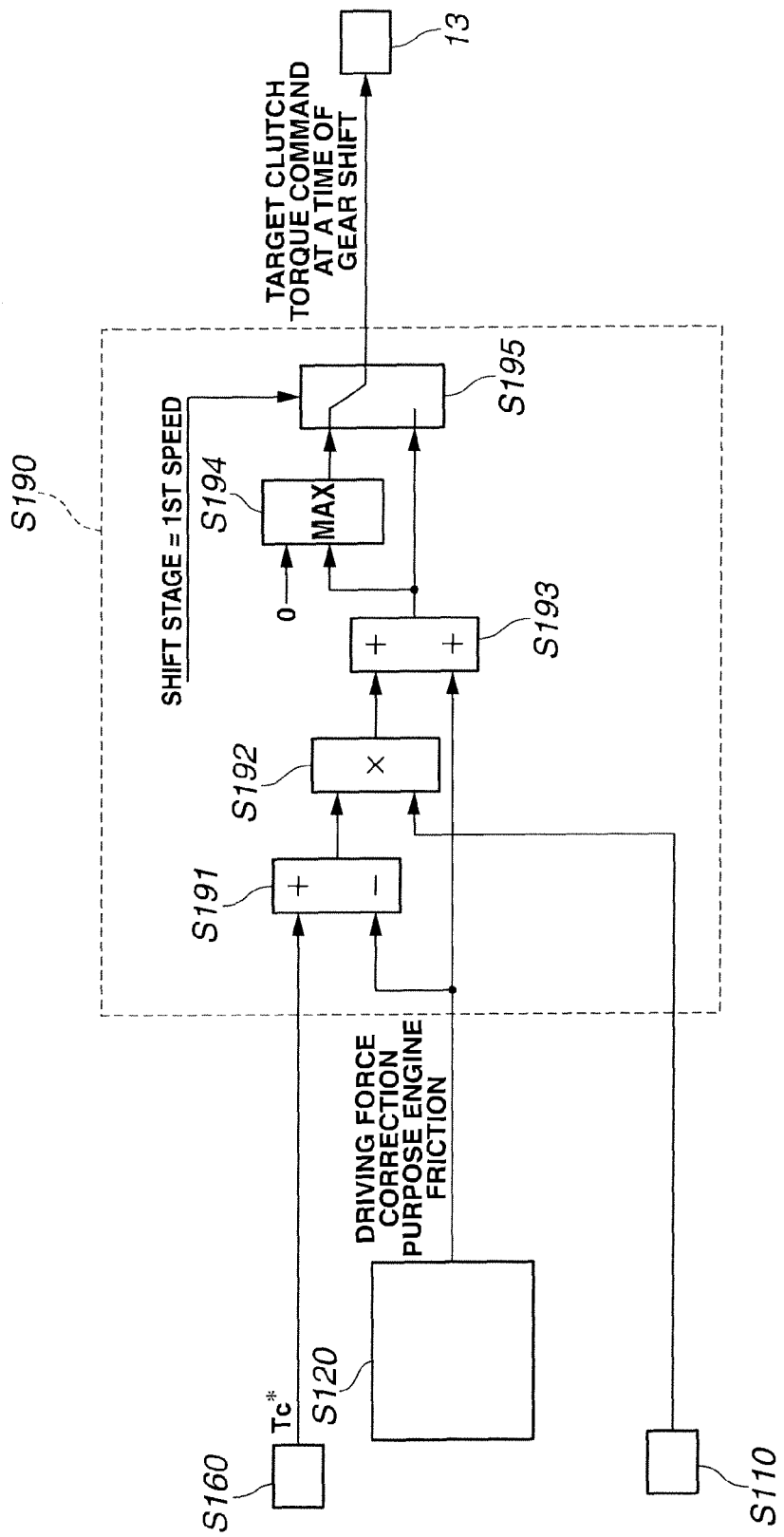
FIG. 16 is an explanatory view representing diagrammatically details of a calculation procedure of a target clutch torque command at a time of gear shift.

The above-described series of processes at S190 will be described in details with reference to FIG. 16. The target clutch torque command at the time of gear shift is derived by multiplying the addition value of the driving force correction purpose engine friction to target clutch torque Tc* at the time of gear shift (S191) by the engine torque reduction rate (S192) and by adding (subtracting) the driving force correction purpose engine friction to the multiplication result (at S193). Then, in a case where the present gear shift stage of automatic transmission 3 is the gear shift stage (for example, first speed) in which the one-way clutch is intervened, at S195, after the command value of the target clutch torque command at the time of gear shift does not give the negative torque, the target clutch torque command at the time of gear shift is outputted. In details, at S194, HCM 10 compares the value obtained at S193 with "0" and outputs one of the two compared values which is larger than the other to S195. In a case where the present gear shift stage of automatic transmission 3 is the gear shift stage (for example, first speed) in which the one-way clutch is intervened, not the value obtained at S193 but the value outputted from S194 to S195 is outputted as the target clutch torque command at the time of gear shift.

At S200, HCM 10 calculates an estimated engine torque Tn to be outputted to S210 using the engine torque reduction rate calculated at S110, the driving force correction purpose engine friction calculated at S120, and Te*Z which is the previous value of target engine torque Te* calculated at S130.

Figure 17:
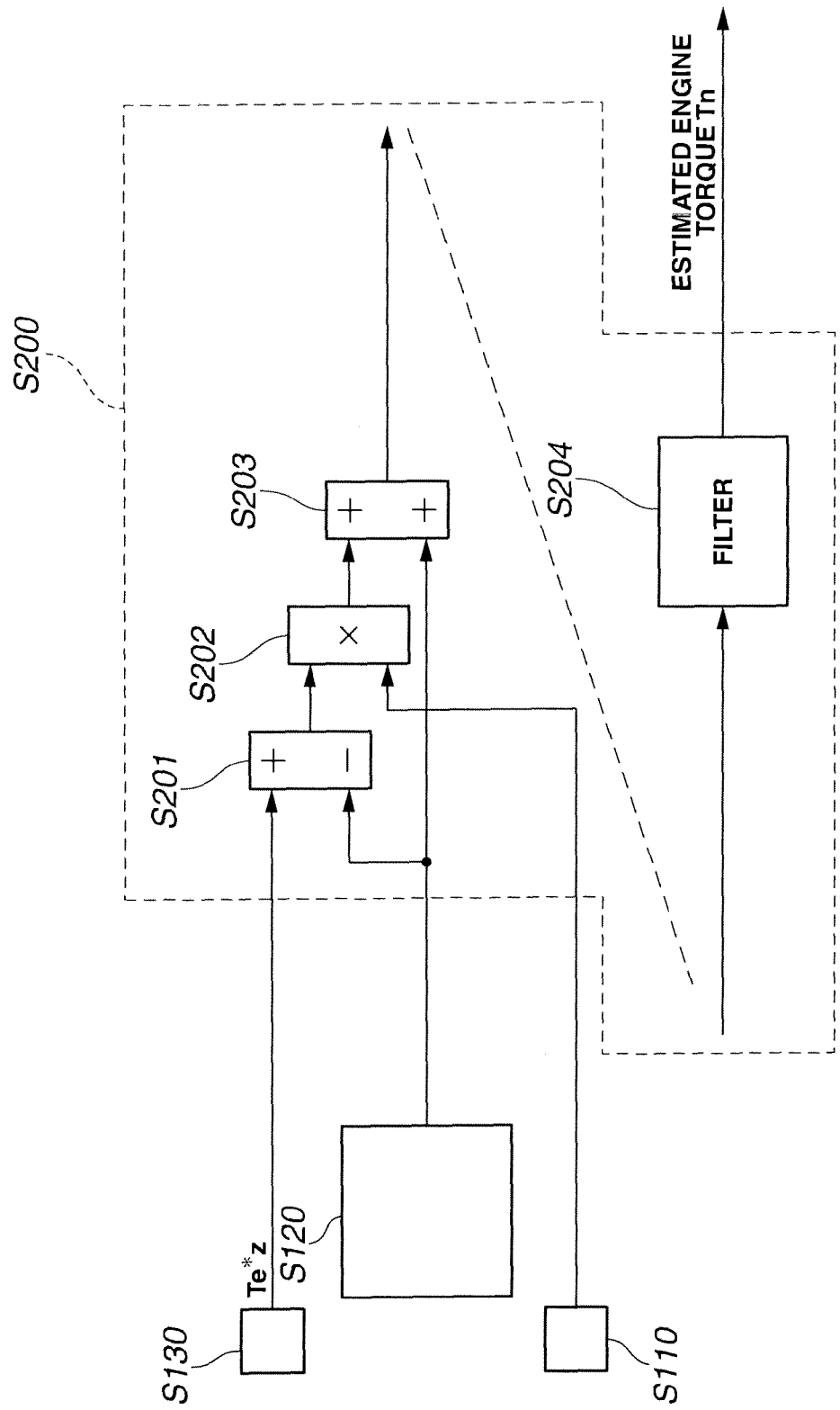
FIG. 17 is an explanatory view representing diagrammatically details of a calculation procedure of an estimated engine torque Tn.

The details at S200 will be described with reference to FIG. 17. Estimated engine torque Tn is derived by multiplying the addition value of the driving force correction purpose engine friction to Te*Z which is the previous value of target engine torque Te* (S201) by the engine torque reduction rate (S202) and by adding (subtracting) the driving force correction purpose engine friction to the multiplication result (at S203). It should be noted that, when estimated engine torque Tn is calculated, it is also possible to use target engine torque Te* (the present value) in place of Te*Z which is the previous value of target engine torque Te*.

At S204, the value obtained at S203 is under a filtering calculation and outputted as estimated engine torque Tn. It should be noted that the filtering carried out at S204 is to simulate a delay in the actual engine torque with respect to the command value.

Then, at S210, a difference between target input torque Tm calculated at S170 and estimated engine torque Tn calculated at S200 is calculated as motor torque Tg which is the motor torque command and is outputted to MC 12.

As described above, the corrections for the motor torque command, the engine torque command, the target driving torque command which is the torque command value for second clutch 7, and the target clutch torque command which is the torque command value at the time of gear shift for automatic transmission 3 are carried out. Thus, the vehicle driveability can be secured by securing the driving force equivalent to the vehicle in which the internal combustion engine is mounted from the reduction in the air density. In other words, in a case where the reduction quantity of actual engine torque due to the reduction in the air density in the hybrid vehicle cannot be suppressed, the suppression of power generation torque Tp suppresses the reduction quantity of actual driving torque Td so that the vehicle driveability can be secured.

In addition, engine 1 can be coordinated with motor 2 so that the balance between the power use quantity when motor 2 assists the driving force of the vehicle and the power supply quantity caused by the power generation of motor 2 is secured.

Furthermore, since, in a case where the gear shift stage is the gear stage in which the one-way clutch is intervened, the torque command for automatic transmission 3 is set in such a way that the post-correction torque commands according to the engine torque reduction rate does not give the negative torque command (S175, S180, S195), the reduction in the input revolution speed due to a disengagement of the one-way clutch, a reverse revolution of the one-way clutch, and a contacting shock of the one-way clutch can be prevented.

Figure 18:
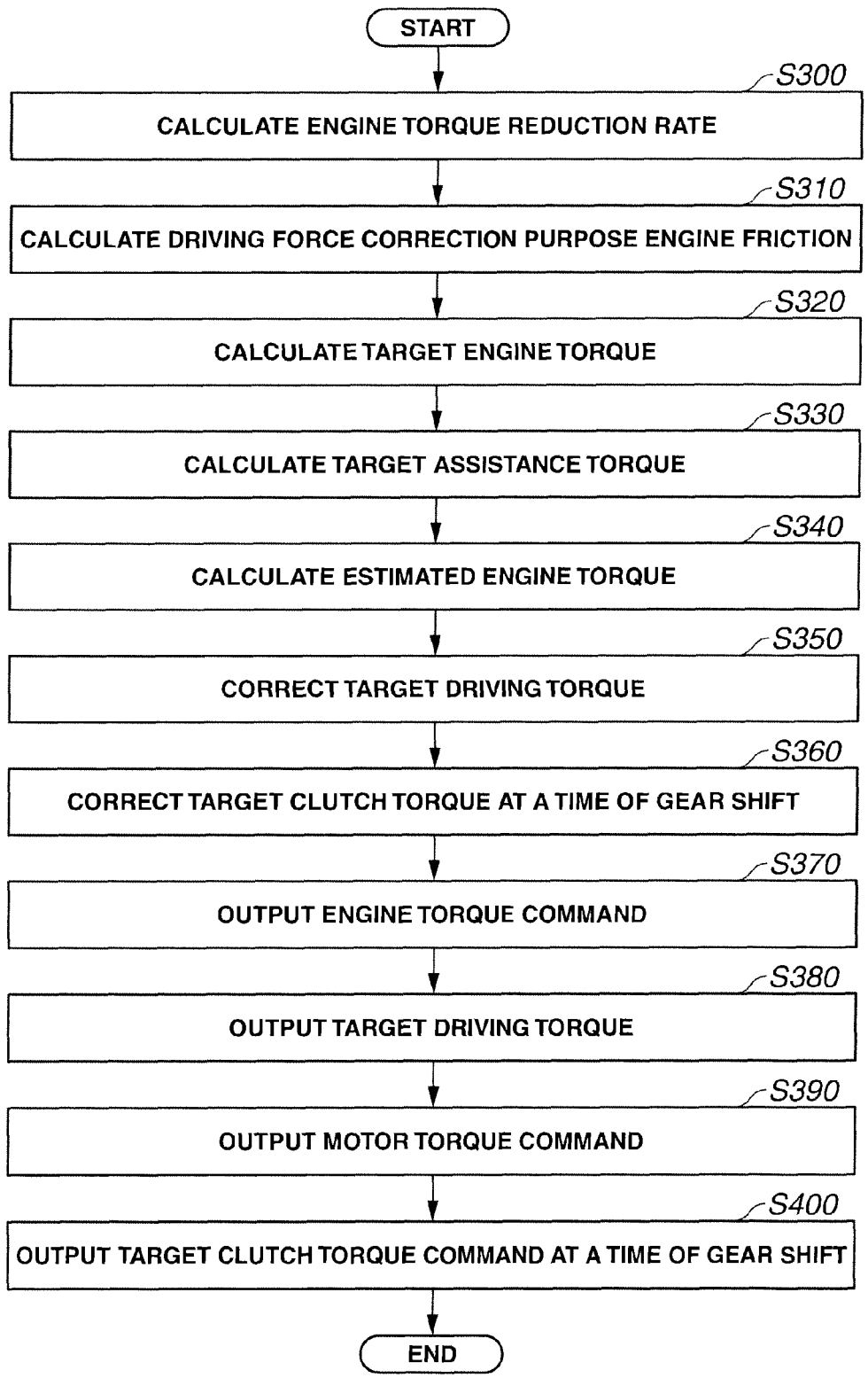
FIG. 18 is a flowchart representing a flow of control in the second embodiment according to the present invention.

FIG. 18 is a flowchart representing a flow of control in the above-described second embodiment.

At a step of S300, HCM 10 calculates the engine torque reduction rate using correction coefficient TTEHOSBU inputted from ECM 11.

At a step of S310, HCM 10 calculates the driving force correction purpose engine friction from the revolution speed of motor 2.

At a step of S320, HCM 10 calculates target engine torque Te* from the engine speed and the accelerator opening angle.

At a step of S330, HCM 10 calculates target assistance torque Ta* from the engine speed and the accelerator opening angle.

At a step of S340, HCM 10 calculates estimated engine torque Tn using the engine torque reduction rate, the driving force correction purpose engine friction, and previous value Te*Z of target engine torque Te*.

At a step of S350, HCM 10 corrects target driving torque Td* calculated using target engine torque Te* and target assistance torque Ta* to calculate target input torque Tm and calculates the target driving torque command which is the torque command value for second clutch 7.

At a step of S360, HCM 10 corrects target clutch torque at the time of gear shift Tc* calculated using target engine torque Te* and target assistance torque Ta* to calculate the target clutch torque command at the time of gear shift which is the torque command value at the time of gear shift for automatic transmission 3.

At a step of S370, HCM 10 outputs target engine torque Te* as the engine torque command to ECM 11.

At a step of S380, HCM 10 outputs the target driving torque command calculated at step of S350 to ATCU 13.

At a step of S390, HCM 10 outputs motor torque Tg which is the difference between target input torque Tm and estimated engine torque Tn to MC 12 as the motor torque command.

At a step of S400, HCM 10 outputs the target clutch torque command at the time of gear shift calculated at S360 to ATCU 13.

Figure 19:
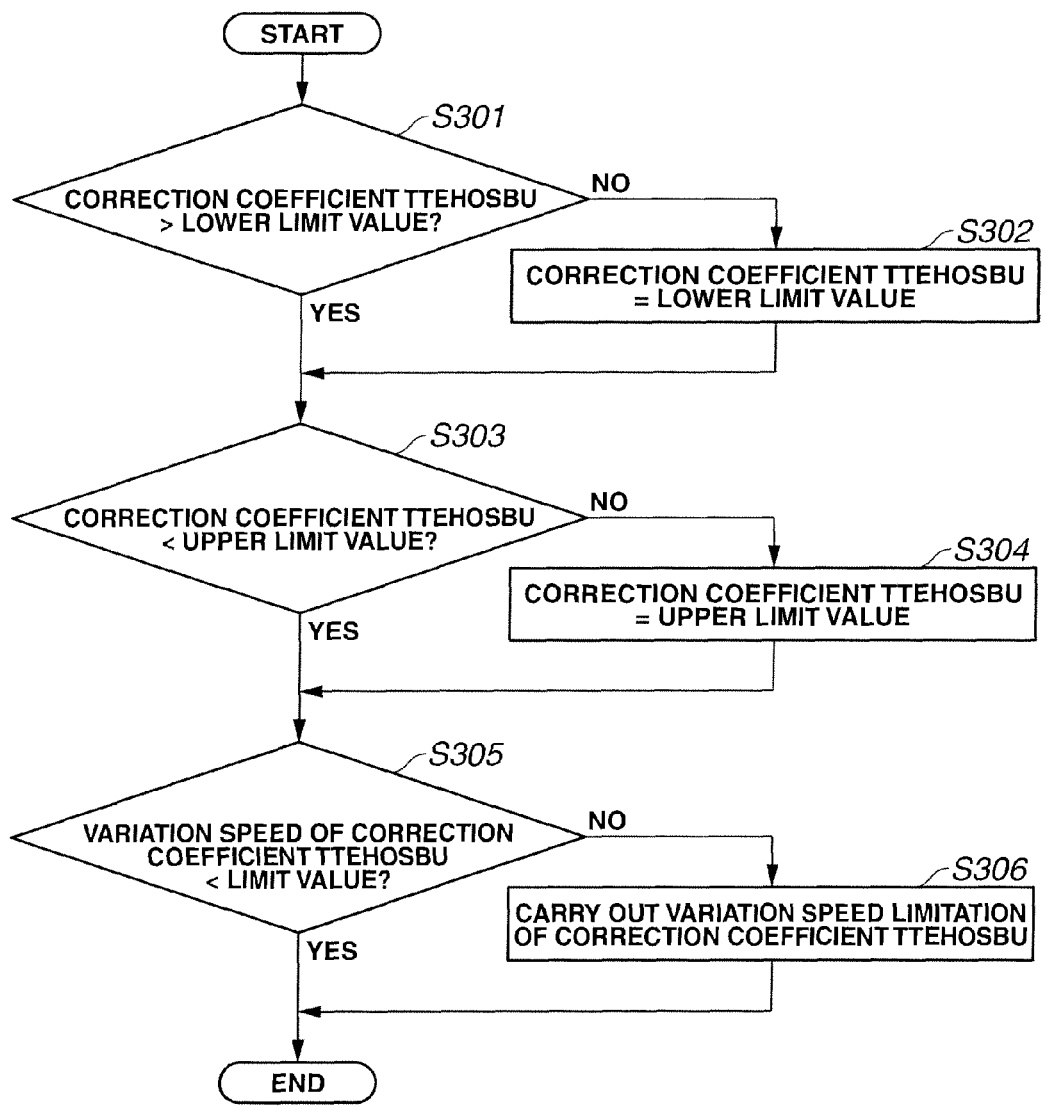
FIG. 19 is a flowchart representing a flow of control when calculating an engine torque reduction rate.

FIG. 19 is a flowchart representing the flow of control when the engine torque reduction rate is calculated and corresponds to a subroutine at step of S300 in FIG. 18.

At a step of S301, HCM 10 determines whether correction coefficient TTEHOSBU inputted from ECM 11 is larger than a preset predetermined lower limit value. If determines to be larger, the routine goes to a step of S330. If determines to be equal to or smaller, the routine goes to a step of S302.

At a step of S302, HCM 10 sets the predetermined lower limit value to correction coefficient TTEHOSBU and the routine goes to S303.

At a step of S303, ECM 11 determines whether correction coefficient TTEHOSBU is smaller than the preset predetermined upper limit value. If determines to be smaller, the routine goes to a step S305. If determines to be equal to or larger, the routine goes to a step of S304.

At the step of S304, HCM 10 sets the predetermined upper limit value to correction coefficient TTEHOSBU. Then, the routine goes to a step of S305.

At the step of S305, HCM 10 determines whether the variation speed of correction coefficient TTEHOSBU is smaller than a preset limit value. If determines to be smaller, HCM 10 outputs correction coefficient TTEHOSBU as the engine torque reduction rate. If determines to be equal to or larger, the routine goes to a step of S306.

At the step of S306, the variation speed limitation for correction coefficient TTEHOSBU is carried out and correction coefficient TTEHOSBU at the step of S306 is outputted as the engine torque reduction rate.

Next, a third preferred embodiment according to the present invention will be described. In the second embodiment, actual driving torque of the vehicle Td is Td=(Td*+Tfric)×α−Tfric. It should, herein, be noted that, in a case where (Td*+Tfric)<0, Td>Td* so that actual driving torque Td becomes larger than target driving torque Td*. Therefore, for example, during a coast traveling of the vehicle, the vehicular deceleration becomes small. Then, in a case where (Td*+Tfric)>0, Td<Td* so that actual driving torque Td becomes smaller than target driving torque Td*. Therefore, for example, during the vehicular traveling on an ascending slope, a creep torque becomes small so that the vehicle reverses when the vehicle is on the ascending slope. In addition, in a case where Td*=0, Td<0 so that actual driving torque Td does not give 0. Therefore, in a case where, for example, the gear shift range of automatic transmission 3 is in a P range, an N range, or the creep torque is eliminated, the actual driving torque does not give 0.

Therefore, in the third embodiment, the following calculation procedures are added in the calculation processes of the torque commands in the second embodiment, namely, the process of calculating target input torque Tm, the process of calculating target torque command, and the process of calculating the target clutch torque at the time of gear shift.

Specifically, the (post-correction) value after the correction using the engine torque reduction rate is limited so as not to be larger than the value before the correction using the engine torque reduction rate is made (refer to S602 in FIG. 20 as will be described later) and so as not to be smaller than the creep torque and the driving torque at the time of coast traveling (refer to S601 in FIG. 20 as will be described later). Then, when the gear shift range of automatic transmission 3 is in the P range or the N range, the target torque gives 0 (refer to S603 in FIG. 20 as will be described later).

Figure 20:
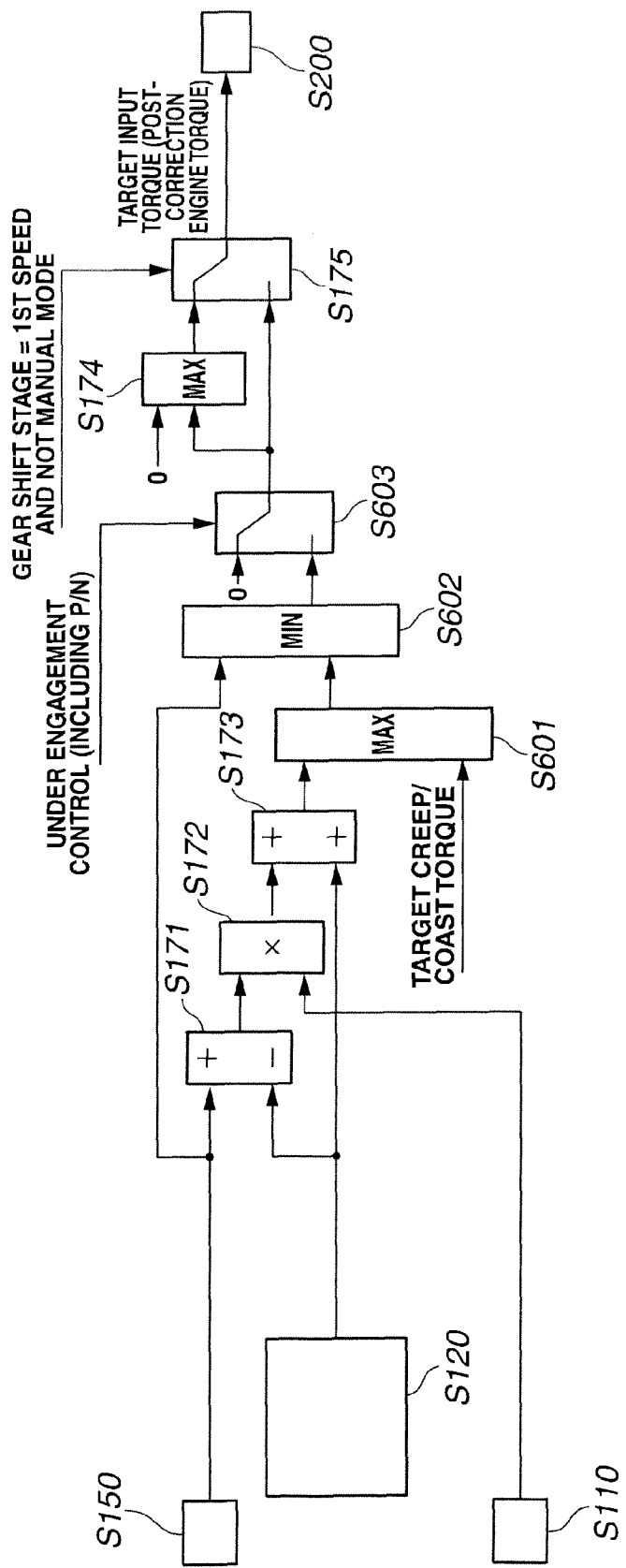
FIG. 20 is an explanatory view representing diagrammatically details of a calculation procedure of a target input torque Tm in a third preferred embodiment according to the present invention.

In addition, in a case where automatic transmission 3 is equipped with an automatic mode in which the gear shift stage is set in accordance with the driving state from among a plurality of gear shift stages and a manual mode in which the gear shift stage is set in accordance with a manual operation of the driver from among the plurality of gear shift stages, the command value of the torque command does not provide the negative torque (refer to S175 in FIG. 20 as will be described later) in a case where the present gear shift stage of automatic transmission 3 is the gear shift stage (for example, first speed) in which the one-way clutch is intervened (refer to S175 in FIG. 20 as will be described later). This is because in a scene where the driver desires an engine braking with the setting of automatic transmission 3 in the manual mode, the engine braking becomes effective to meet an intention to the vehicle driver.

The calculation process of target input torque Tm will be exemplified using FIG. 20. S171 through S173 in FIG. 15 described above are the same processes as S171 through S173 in FIG. 20. Three series of processes of S601, S602, and S603 (as will be described later) are added at a downstream side of S173 in FIG. 15. In addition, as for S175, a condition such that the gear shift mode of automatic transmission 3 is not the manual mode is newly added in the third embodiment. Otherwise, S175 in the third embodiment is the same as S175 in the second embodiment.

As will be described in details, if, at S601, a magnitude between the value obtained at S173 (the value obtained by multiplying the value which is a division of the driving force correction purpose engine friction from target driving torque Td* by the engine torque reduction rate and by adding the driving force correction purpose engine friction to the multiplication result) with a target creep torque or a target coast torque (a target torque when the accelerator is released) and one of the two values which is larger than the other is outputted to S602. It should be noted that a case where the former is compared with the target creep torque corresponds to a case of a vehicle start and a case where the former is compared with the target coast torque corresponds to a case where the vehicle is traveling.

At S602, HCM 10 compares a magnitude between the value outputted from S601 and target driving torque Td* and outputs one of the two values which is smaller than the other to S603.

At S603, in a case where the shift range is P range or N range and frictional elements within automatic transmission 3 are under control directing toward a position of P range or N range, the target torque is set to 0. if not so, the target torque inputted from S602 is outputted.

In a case where the present shift stage of automatic transmission 3 is the gear stage (for example, first speed) in which the one way clutch is intervened and the gear shift mode of automatic transmission 3 is not the manual mode, target input torque Tm at S175 is outputted without the value not to be negative. In details, at S174, HCM 10 compares the value obtained at S603 with "0" and one of the two values which is larger than the other is outputted to S175 and in a case where the present gear shift stage of automatic transmission 3 is not in the manual mode, not the value outputted from S603 but the value outputted from S174 to S175 is assumed as target input torque Tm.

Figure 15:
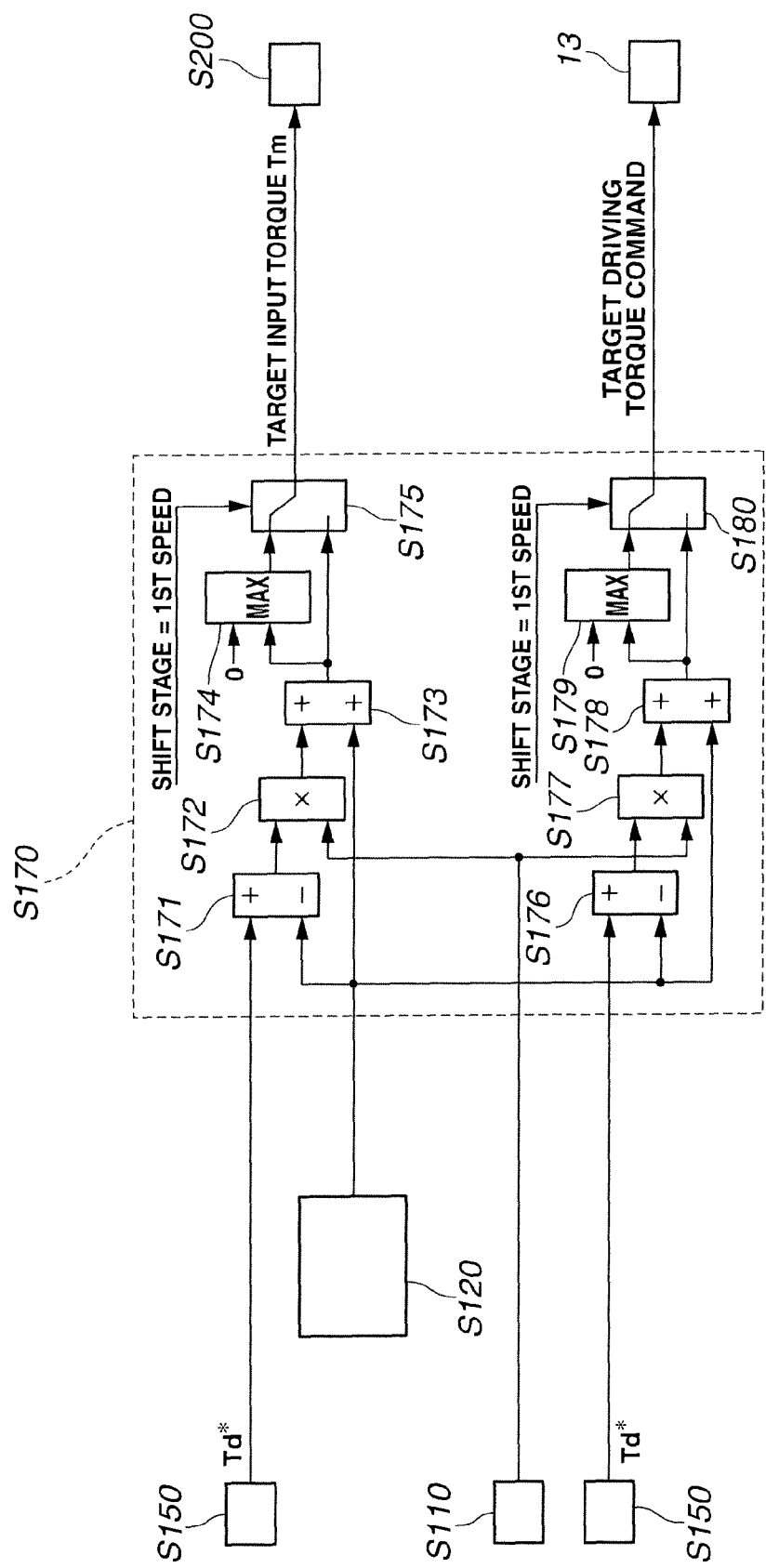
FIG. 15 is an explanatory view representing diagrammatically details of calculation procedures of a target input torque Tm and a target driving torque command.

It should be noted that, in a case where the target driving torque command is calculated, three series of processes of S601 through S603 are added at the downstream side of S178 in FIG. 15. At S180, such a condition that the gear shift mode of automatic transmission 3 is not in the manual mode is newly added at S180. In a case where the target clutch torque command at the time of gear shift is calculated, three series of processes of S601 through S603 are added at the downstream side of S193 in FIG. 16. At S195, the condition that the gear shift mode of automatic transmission 3 is not the manual mode is newly added.

Since, in the third embodiment described above, the target torque corrected using the engine torque reduction rate does not become larger than the target torque before the correction is made using the engine torque reduction rate, the driveability can be secured.

Since, the target torque corrected using the engine reduction rate is not smaller than the target creep torque, the vehicle reverse movement due to the lack of the creep torque during the start on the slope can be suppressed.

In addition, since the target torque corrected using the engine torque reduction rate does not become smaller than the target coast torque, the driveability when the accelerator is released can be secured.

The invention claimed is:

1. A hybrid vehicle, comprising:
an engine;
a motor, the engine and the motor being driving sources of the vehicle;
a first traveling mode in which an output of the engine is utilized to drive the vehicle;
a second traveling mode in which the vehicle is driven through an output of the motor with the engine stopped; and
an air density detecting section configured to detect the air density of an environment under which the vehicle travels, wherein, in a case where the detected air density is reduced with respect to a standard air density, the output of the motor in the second traveling mode is reduced with respect to the output of the motor in the standard air density such that a driving force of the vehicle in the second traveling mode when the traveling mode is switched approaches the driving force of the vehicle in the first traveling mode.

2. The hybrid vehicle as claimed in claim 1, wherein, when the detected air density is reduced with respect to the standard air density, in the first traveling mode, a correction such that a power generation load of the motor is reduced with respect to the output of the engine is carried out and, in the second traveling mode, another correction such that the output of the motor is reduced to approach the driving force of the vehicle in the second traveling mode when the traveling mode is switched to a post-correction driving force of the vehicle in the first traveling mode is carried out.

3. The hybrid vehicle as claimed in claim 1, wherein, when the detected air density is reduced with respect to the standard air density, in the first traveling mode, a correction such that the output of the motor with respect to the engine is reduced is carried out, and, in the second traveling mode, another correction such that the output of the motor is reduced to approach the driving force of the vehicle in the second traveling mode when the traveling mode is switched to a post-correction driving force of the vehicle in the first traveling mode is carried out.

4. The hybrid vehicle as claimed in claim 1, wherein, when the detected air density is raised with respect to the standard air density, in the first traveling mode, a correction such that the output of the engine is reduced to approach the driving force of the vehicle in the first traveling mode when the traveling mode is switched to the driving force of the vehicle in the second traveling mode is carried out.

5. The hybrid vehicle as claimed in claim 1, wherein the vehicle is equipped with a transmission configured to achieve a plurality of gear shift stages according to a replacement of related frictional elements in an inside of the transmission and located at a downstream side of the driving sources and a transmission torque capacity of the frictional elements which is a target clutch torque at a time of gear shift for the frictional elements within the transmission is corrected in accordance with the air density.

6. The hybrid vehicle as claimed in claim 5, wherein a correction quantity of a correction carried out in accordance with the air density is based on a reduction rate of the output of the engine due to the reduction in the air density.

7. The hybrid vehicle as claimed in claim 1, wherein limitations of an upper limit value and a lower limit value and another limitation of a variation speed are set for an engine torque output correction coefficient corresponding to the air density.

8. The hybrid vehicle as claimed in claim 7, wherein the driving force of the vehicle corrected according to the engine torque output correction coefficient is set such that a value of a post-correction driving force of the vehicle after a correction becomes equal to or smaller than the value thereof before the correction.

9. The hybrid vehicle as claimed in claim 7, wherein the driving force of the vehicle corrected according to the engine torque output correction coefficient is set such that the value of the post-correction driving force after the correction is larger than a target creep torque of the vehicle.

10. The hybrid vehicle as claimed in claim 7, wherein the transmission is provided with an automatic mode in which a gear shift stage is set to one of a plurality of gear shift stages which accords with a driving state of the vehicle, with a manual mode in which the gear shift stage is set to one of the plurality of gear shift stages which accords with a manual operation of a vehicle driver, and with a gear shift stage within which a one-way clutch is intervened and a post-correction driving force of the vehicle after the correction which is carried out in accordance with the engine torque output correction coefficient is set to be equal to or larger than 0, in a case where the gear shift stage of the transmission is the gear shift stage in which the one-way clutch is intervened and a gear shift mode of the transmission is not in the manual mode.

* * * * *